US011940756B2

(12) United States Patent
Chadani et al.

(10) Patent No.: US 11,940,756 B2
(45) **Date of Patent: *Mar. 26, 2024**

(54) PROCESS CARTRIDGE AND IMAGE FORMING APPARATUS

(71) Applicant: CANON KABUSHIKI KAISHA, Tokyo (JP)

(72) Inventors: Kazuo Chadani, Suntoh-gun (JP); Tomonori Mori, Numazu (JP); Koji Hashimoto, Suntoh-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,729

(22) Filed: Nov. 30, 2022

(65) Prior Publication Data

US 2023/0095168 A1 Mar. 30, 2023

Related U.S. Application Data

(62) Division of application No. 17/370,097, filed on Jul. 8, 2021, now Pat. No. 11,543,769, which is a division (Continued)

(30) Foreign Application Priority Data

Dec. 11, 2006 (JP) ................................ 2006-332837
Oct. 3, 2007 (JP) ................................ 2007-259660

(51) Int. Cl.
*G03G 21/18* (2006.01)
*G03G 21/16* (2006.01)

(52) U.S. Cl.
CPC ..... *G03G 21/1821* (2013.01); *G03G 21/1609* (2013.01); *G03G 21/1839* (2013.01);

(Continued)

(58) Field of Classification Search
CPC ........... G03G 21/1821; G03G 21/1609; G03G 21/1839; G03G 21/186; G03G 2221/1657;

(Continued)

(56) References Cited

U.S. PATENT DOCUMENTS 4,835,565 A 5/1989 Nagatsuna et al.
5,070,366 A 12/1991 Tsuchiya (Continued)

FOREIGN PATENT DOCUMENTS

CN 1176407 3/1998
CN 1734365 A 2/2006

(Continued)

OTHER PUBLICATIONS

Singapore Search Report and Written Opinion in Singapore Patent Application No. 200902535-4, dated Nov. 2, 2009.

(Continued)

*Primary Examiner* — Sandra Brase
(74) *Attorney, Agent, or Firm* — Venable LLP

(57) ABSTRACT

A process cartridge comprises a photosensitive drum and a developing roller. A coupling member is provided adjacent to one axial end of the developing roller. The coupling member includes a driven portion, and an intermediary portion configured and positioned to engage with the driven portion. The intermediary portion is also configured to be movable relative to the driven portion in a direction crossing the axis of the developing roller while maintaining engagement with the driven portion. The coupling member further includes a driving portion configured and positioned to receive a driving force for rotating the developing roller. The driving portion is also configured to engage with the intermediary portion, and to be movable relative to the intermediary portion in a direction crossing the axis of the developing roller while maintaining engagement with the intermediary portion.

10 Claims, 31 Drawing Sheets

Related U.S. Application Data of application No. 17/011,119, filed on Sep. 3, 2020, now Pat. No. 11,131,959, which is a division of application No. 16/515,327, filed on Jul. 18, 2019, now Pat. No. 10,795,309, which is a division of application No. 15/964,117, filed on Apr. 27, 2018, now Pat. No. 10,401,783, which is a division of application No. 15/364,474, filed on Nov. 30, 2016, now Pat. No. 9,983,542, which is a division of application No. 14/832,262, filed on Aug. 21, 2015, now Pat. No. 9,581,958, which is a division of application No. 13/437,331, filed on Apr. 2, 2012, now Pat. No. 9,134,688, which is a division of application No. 13/012,181, filed on Jan. 24, 2011, now Pat. No. 8,335,454, which is a division of application No. 11/869,382, filed on Oct. 9, 2007, now Pat. No. 7,899,364.

(52) U.S. Cl.
CPC ... *G03G 21/186* (2013.01); *G03G 2221/1657* (2013.01); *G03G 2221/1853* (2013.01); *G03G 2221/1884* (2013.01)

(58) Field of Classification Search
CPC ... G03G 2221/1853; G03G 2221/1884; G03G 21/1857; G03G 15/0822
See application file for complete search history.

(56) References Cited

U.S. PATENT DOCUMENTS

| | | | | |
|---|---|---|---|---|
| 5,740,500 | A | 4/1998 | Hashimoto | |
| 5,813,782 | A | 9/1998 | Mason | |
| 5,920,753 | A | 7/1999 | Sasaki et al. | |
| 5,923,924 | A | 7/1999 | Hashimoto | |
| 5,943,529 | A | 8/1999 | Miyabe et al. | |
| 5,966,567 | A | 10/1999 | Matsuzaki et al. | |
| 6,009,291 | A | 12/1999 | Curry et al. | |
| 6,016,408 | A | 1/2000 | Hashimoto et al. | |
| 6,101,352 | A | 8/2000 | Hashimoto et al. | |
| 6,144,815 | A | 11/2000 | Chadani et al. | |
| 6,151,459 | A | 11/2000 | Hashimoto et al. | |
| 6,157,792 | A | 12/2000 | Mori et al. | |
| 6,173,140 | B1 | 1/2001 | Suzuki et al. | |
| 6,173,145 | B1 | 1/2001 | Chadani et al. | |
| 6,246,849 | B1 | 6/2001 | Yokoyama et al. | |
| 6,266,503 | B1 | 7/2001 | Murayama et al. | |
| 6,272,299 | B1 | 8/2001 | Numagami et al. | |
| 6,282,389 | B1 | 8/2001 | Matsuzaki et al. | |
| 6,285,847 | B1 | 9/2001 | Tanizaki et al. | |
| 6,301,457 | B1 | 10/2001 | Chadani et al. | |
| 6,418,292 | B1 | 7/2002 | Isobe et al. | |
| 6,463,234 | B2 | 10/2002 | Arimitsu et al. | |
| 6,496,667 | B2 | 12/2002 | Shiratori et al. | |
| 6,512,903 | B2 | 1/2003 | Chadani | |
| 6,560,422 | B2 | 5/2003 | Kanno et al. | |
| 6,671,474 | B2 | 12/2003 | Chadani | |
| 6,735,403 | B2 | 5/2004 | Kanno et al. | |
| 6,823,155 | B2 | 11/2004 | Tsuda et al. | |
| 6,826,380 | B2 | 11/2004 | Karakama et al. | |
| 6,834,171 | B2 | 12/2004 | Nittani et al. | |
| 6,907,212 | B2 | 6/2005 | Harada et al. | |
| 6,934,485 | B2 | 8/2005 | Miyabe et al. | |
| 6,980,759 | B2 | 12/2005 | Kanno et al. | |
| 7,027,754 | B2 | 4/2006 | Harada et al. | |
| 7,058,337 | B2 | 6/2006 | Hashimoto et al. | |
| 7,082,276 | B2 | 7/2006 | Karakama et al. | |
| 7,136,604 | B2 | 11/2006 | Chadani et al. | |
| 7,184,682 | B2 | 2/2007 | Chadani et al. | |
| 7,184,686 | B2 | 2/2007 | Kanno et al. | |
| 7,231,164 | B2 | 6/2007 | Harada et al. | |
| 7,233,752 | B2 | 6/2007 | Harada et al. | |
| 7,292,808 | B2 | 11/2007 | Murofushi | |
| 7,395,014 | B2 | 7/2008 | Kim et al. | |
| 7,899,364 | B2 | 3/2011 | Chadani et al. | |
| 7,890,025 | B2 | 11/2011 | Chadani et al. | |
| 8,116,661 | B2 | 2/2012 | Chadani et al. | |
| 8,335,454 | B2 | 12/2012 | Chadani et al. | |
| 8,442,416 | B2 | 5/2013 | Chadani et al. | |
| 8,447,209 | B2 | 5/2013 | Chadani et al. | |
| 8,583,007 | B2 | 11/2013 | Chadani et al. | |
| 8,588,647 | B2 | 11/2013 | Chadani et al. | |
| 9,134,688 | B2 | 9/2015 | Chadani et al. | |
| 9,581,958 | B2 | 2/2017 | Chadani et al. | |
| 9,983,542 | B2 | 5/2018 | Chadani et al. | |
| 10,401,783 | B2 | 9/2019 | Chadani et al. | |
| 10,795,309 | B2 * | 10/2020 | Chadani | G03G 21/1821 |
| 11,131,959 | B2 * | 9/2021 | Chadani | G03G 21/1839 |
| 11,543,769 | B2 * | 1/2023 | Chadani | G03G 21/1609 |
| 2001/0017994 | A1 | 8/2001 | Arimitsu et al. | |
| 2003/0012589 | A1 * | 1/2003 | Kanari | G03G 15/081 399/281 |
| 2003/0123909 | A1 | 7/2003 | Akashi et al. | |
| 2003/0215731 | A1 | 11/2003 | Saiki et al. | |
| 2004/0096247 | A1 | 5/2004 | Ki et al. | |
| 2004/0265000 | A1 | 12/2004 | Okabe | |
| 2005/0025522 | A1 | 2/2005 | Tsuzuki et al. | |
| 2005/0069338 | A1 | 3/2005 | Oguma et al. | |
| 2006/0008289 | A1 | 1/2006 | Sato et al. | |
| 2006/0034637 | A1 | 2/2006 | Kim et al. | |
| 2006/0177231 | A1 | 8/2006 | Mori et al. | |
| 2006/0228132 | A1 | 10/2006 | Chadani et al. | |
| 2006/0239711 | A1 | 10/2006 | Hymas et al. | |
| 2006/0245784 | A1 | 11/2006 | Tsuzuki et al. | |
| 2006/0245785 | A1 | 11/2006 | Kawamura et al. | |
| 2007/0071495 | A1 | 3/2007 | Hashimoto et al. | |
| 2007/0141889 | A1 | 6/2007 | Chadani et al. | |
| 2011/0123224 | A1 | 5/2011 | Chadani et al. | |
| 2012/0063810 | A1 | 3/2012 | Chadani et al. | |
| 2012/0128388 | A1 | 5/2012 | Chadani et al. | |
| 2012/0189343 | A1 | 7/2012 | Chadani et al. | |
| 2012/0230726 | A1 | 9/2012 | Chadani et al. | |

FOREIGN PATENT DOCUMENTS

| | | |
|---|---|---|
| EP | 1 258 783 | 11/2002 |
| EP | 2054776 | 5/2009 |
| GB | 2141520 | 12/1984 |
| JP | 1-77759 | 12/1989 |
| JP | 1-178225 | 12/1989 |
| JP | 2-21049 | 1/1990 |
| JP | 2-238469 | 9/1990 |
| JP | 4-43378 | 2/1992 |
| JP | 7-261590 | 10/1995 |
| JP | 9-171339 | 6/1997 |
| JP | 2900530 | 3/1999 |
| JP | H 02-287577 | 11/1999 |
| JP | 11-338211 | 12/1999 |
| JP | 2000-214654 | 8/2000 |
| JP | 2000-284592 | 10/2000 |
| JP | 2001-255806 | 9/2001 |
| JP | 2001-312196 | 11/2001 |
| JP | 2001-337511 | 12/2001 |
| JP | 2002-006722 | 1/2002 |
| JP | 2002-328499 | 11/2002 |
| JP | 2006-276190 | 10/2006 |
| RU | 2 120 387 | 10/1998 |
| TW | 517179 | 1/2003 |
| TW | 200512550 | 4/2005 |

OTHER PUBLICATIONS

Japanese Office Action dated Sep. 8, 2009, in Japanese Patent Application No. 2007-259660, and English-language translation thereof.
English language translation of Vietnamese Office Action dated Oct. 4, 2010, in Vietnamese Application No. 1-2009-01036, dated Oct. 4, 2010.
Supplementary Search Report in Singapore Patent Application No. 200902535-4, dated Sep. 27, 2010.

(56) References Cited

OTHER PUBLICATIONS

Official Communication in Korean Patent Application No. 10-2009-7011949, dated Nov. 17, 2010.
PCT International Search Report in PCT/JP2007/071674, dated Jun. 16, 2008.
English translation of Official Communication in Korean Patent Application No. 10-2009-7011949, dated Nov. 16, 2009.
Chinese Office Action dated Jul. 7, 2010, in Chinese Patent Application No. 200780045749.6, and English-translation thereof.
Notice of Allowance in Korean Patent Application No. 10-2009-7011949, dated May 7, 2012.
Notice of Allowance in Australian Patent Application No. 2011254086, dated Aug. 28, 2012.
Notice of Allowance in Australiain Patent Application No. 2012200185, dated Aug. 38, 2012.
Decision on Grant in Russian Patent Application No. 2011141533/28, dated Feb. 5, 2014 (with English translation).
Decision on Grant in Russian Patent Application No. 2011141561/28, dated Jan. 29, 2014 (with English translation).
Decision on Grant in Russian Patent Application No. 2011141555/28, dated Feb. 5, 2014 (with English translation).
Notice of Allowance in Chinese Patent Application No. 201110159417.9, dated Feb. 5, 2015.
Office Action in Taiwanese Patent Application No. 096142484, dated Jun. 28, 2012 (with English translation).
Notice of Allowance in Korean Patent Application No. 10-2011-7011129, dated Jun. 22, 2012.
Notice of Allowance in Korean Patent Application No. 10-2011-7011130, dated Jun. 22, 2012.
Communication in European Patent Application No. 07 831 405.1, dated Nov. 5, 2012.
Notice of Allowance in Korean Patent Application No. 10-2012-7000387, dated Dec. 18, 2012.
Notice of Allowance in Korean Patent Application No. 10-2012-7000388, dated Dec. 18, 2012.
Notice of Allowance in Korean Patent Application No. 10-2012-7000390, dated Dec. 18, 2012.
Notice of Allowance in Chinese Patent Application No. 201110029120, dated Jul. 6, 2015.
Apr. 8, 2015 Office Action in Taiwanese Patent Application No. 101138907 (with English translation).
Communication in European Patent Application No. 14158347.6, dated May 6, 2014.
Notice of Allowance in Korean Patent Application No. 10-2011-7011125, dated Feb. 1, 2013.
Notice of Allowance in Korean Patent Application No. 10-2012-7033621, dated Jan. 29, 2013.
Notice of Allowance in Chinese Patent Application No. 201110159403.7, dated Mar. 16, 2016.
Notice of Allowance in Chinese Patent Application No. 201110158524.x, dated Mar. 16, 2016.
Office Action in Taiwanese Patent Application No. 104135826, dated Nov. 14, 2016 (with English translation).
Examination Report in Canadian Patent Application No. 2,910,769, dated Dec. 12, 2016.
Examination Report in Canadian Patent Application No. 2,910,676, dated Dec. 22, 2016.
Examination Report in Canadian Patent Application No. 2,910,679, dated Dec. 22, 2016.
Examination Report in Canadian Patent Application No. 2,910,765, dated Dec. 28, 2016.
Examination Report in Canadian Patent Application No. 2,910,524, dated Dec. 28, 2016.
Examination Report in Canadian Patent Application No. 2,910,527, dated Nov. 28, 2016.
Nov. 28, 2017 Office Action in Indian Patent Application No. 3307/CHENP/2009.
Extended Search Report in European Patent Application No. 18 170 030.3, dated Sep. 25, 2018.
Oct. 16, 2018 Office Action in Brazilian Patent Application No. PI0719663-6 (with English translation).
Extended Search Report in European Patent Application No. 18 170 029.5, dated Sep. 25, 2018.
Office Action in Brazilian Patent Application No. 122019000413-7, dated Apr. 24, 2019 (with partial English translation).
Office Action in Brazilian Patent Application No. 122019000412-9, dated Apr. 24, 2019 (with partial English translation).
Communication in European Patent Application No. 18 170 030.3, dated Dec. 19, 2019.
Communication in European Patent Application No. 18 170 029.5, dated Dec. 19, 2019.
Feb. 3, 2020 Substantive Examination Report in Malaysian Patent Application No. PI 2015002563.
Mar. 29, 2021 Notice of Allowance in Taiwanese Patent Application No. 109116273.
Jun. 28, 2021 Office Action in Indian Patent Application No. 201848019876.
Jul. 29, 2021 Examination Report in Indian Patent Application No. 201848019893.
Oct. 12, 2021 Examination Report in Indian Patent Application No. 201848019894.
Oct. 18, 2022 Examination Report in Singapore Patent Application No. 10202100986W.

* cited by examiner

PROCESS CARTRIDGE AND IMAGE FORMING APPARATUS

FIELD OF THE INVENTION AND RELATED ART

Field of the Invention

The present invention relates to a process cartridge and an electrophotographic image forming apparatus which uses the same.

Here, the electrophotographic image forming apparatus forms an image on a recording material using an electrophotographic type process. The examples of the electrophotographic image forming apparatus include an electrophotographic copying machine, an electrophotographic printer (for example, a laser beam printer, an LED printer, and so on), a facsimile device, and a word processor.

The process cartridge is a cartridge which comprises at least developing means and an electrophotographic photosensitive drum in the cartridge integrally, and it is detachably mountable to the main assembly of the electrophotographic image forming apparatus.

Heretofore, the photosensitive drum and the process means actable on the photosensitive drum are integrally unified into a cartridge in the electrophotographic image forming apparatus using the electrophotographic image forming process. The process cartridge type of apparatus in which this cartridge is detachably mountable to the main assembly of the electrophotographic image forming apparatus, is employed. In this process cartridge type apparatus, the maintenance operation of the apparatus can be performed without depending on a service person, and therefore, the operability can be remarkably improved. Therefore, this process cartridge type apparatus is used widely in the electrophotographic image forming apparatus.

Light corresponding to the image information, such as the laser, an LED, or the lamp, is projected onto the photosensitive drum in the electrophotographic image forming apparatus. By doing so, an electrostatic latent image is formed on the photosensitive drum. This electrostatic latent image is developed by a developing device. The developed image formed on the photosensitive drum is transferred onto a recording material. By doing so, the image is formed on the recording material.

JP 2001-255806A discloses the color electrophotographic image forming apparatus of the in-line type in which a plurality of process cartridges are put in order by the one array. The process cartridge has a drum unit which includes a photosensitive drum, and a developing unit which includes a developing roller, and they are rotatably connected relative to each other by a pin. The photosensitive drum is provided with a cartridge coupling on an axial end of the photosensitive drum. When the process cartridge is mounted to the main assembly of the apparatus, a cartridge coupling engages with a main assembly coupling provided in the main assembly of the apparatus, so that the driving force is transmitted. A driving force is transmitted to the developing roller through the idler gears from the input gear functioning as the development driving force transmission member provided on the pin of the developing unit. When the process cartridge is mounted to the main assembly of the apparatus, the input gear is engaged with the gear provided in the main assembly of the apparatus, and engagement occurs so that the cartridge receives the driving force. More particularly, the drive transmissions of driving forces to the photosensitive drum and to the developing roller are received from the main assembly of the apparatus and carried out independently from each other.

However, recently, further downsizing and image quality improvement of the process cartridge and the electrophotographic image forming apparatus are desired. The input gear is provided on a swing center which does not change in the position even if the developing unit swings in the conventional example. For this reason, the developing roller requires a space in order to receive the driving force from the input gear through the idler gear of the process cartridge. The rotational accuracy of the developing roller is influenced by the engagement among the input gear, the idler gear, and the main assembly gear.

SUMMARY OF THE INVENTION

The present invention further develops the prior art structures mentioned above.

Accordingly, it is a principal object of the present invention to provide a process cartridge and a small size electrophotographic image forming apparatus in which a rotational driving force is directly inputted to the developing roller through the shaft coupling member from the main assembly of the apparatus independently from the driving input to the photosensitive drum.

It is another object of the present invention to provide a process cartridge and an image forming apparatus in which even after the photosensitive drum and the developing roller are spaced apart, when the process cartridge is mounted, the engaging portion and a second main assembly drive transmission member of a shaft coupling member engage with each other, smoothly.

It is a further object of the present invention to provide a process cartridge and an image forming apparatus in which the rotational accuracy of the developing roller is improved, so that the image quality is improved.

According to an aspect of the present invention, there is provided a process cartridge detachably mountable to a main assembly of an electrophotographic image forming apparatus. The main assembly includes a rotatable first main assembly drive transmission member and a rotatable second main assembly drive transmission member. The process cartridge comprises an electrophotographic photosensitive drum, a drum unit, a drum roller, a developing unit, a drum coupling member, and a shaft coupling member. The drum unit comprises the electrophotographic photosensitive drum. The developing roller is for developing an electrostatic latent image formed on the electrophotographic photosensitive drum with a developer. The developing unit comprises the developing roller and is movably connected with the drum unit. The developing unit is movable relative to the drum unit between a contact position in which the developing roller is contacted to the electrophotographic photosensitive drum and a spaced position in which the developing roller is spaced from the electrophotographic photosensitive drum. The drum coupling member is provided on one axial end of the electrophotographic photosensitive drum, for engaging with the first main assembly drive transmission member and transmitting a first rotational driving force to the electrophotographic photosensitive drum, when the process cartridge is mounted to the main assembly of the apparatus along an axial direction of the electrophotographic photosensitive drum. The shaft coupling member is provided on one axial end of the developing roller, for transmitting a second rotational driving force with a deviation permitted between an axis of the second main assembly drive transmission member and an axis of the developing roller. The shaft coupling member includes an engaging portion for engaging with the second main assembly drive transmission member and receiving the second rotational driving force, when the process cartridge is mounted to the main assembly of the apparatus. The engaging portion is movable in a direction crossing with the axial direction of the developing roller. When the process cartridge enters the main assembly of the apparatus with the developing unit positioned in the spaced position, an axis of the engaging portion is deviated from the axis of the developing roller with respect to the crossing direction.

According to another aspect of the present invention, there is provided a process cartridge detachably mountable to a main assembly of an electrophotographic image forming apparatus, in which the main assembly includes a first rotatable main assembly drive transmission member, and a second rotatable main assembly drive transmission member. The process cartridge comprises an electrophotographic photosensitive drum, a drum unit, a developing roller, a developing unit, a drum coupling member, an Oldham coupling, and an intermediary engaging portion. The drum unit contains the electrophotographic photosensitive drum. The developing roller is for developing an electrostatic latent image formed on the electrophotographic photosensitive drum with a developer. The developing unit comprises the developing roller and is movably connected with the drum unit, the developing unit being movable relative to the drum unit between a contact position in which the developing roller is contacted to the electrophotographic photosensitive drum and a spaced position in which the developing roller is spaced from the electrophotographic photosensitive drum. The drum coupling member is provided on one axial end of the electrophotographic photosensitive drum, for engaging with the first main assembly drive transmission member and transmitting a first rotational driving force to the electrophotographic photosensitive drum, when the process cartridge is mounted to the main assembly of the apparatus along an axial direction of the electrophotographic photosensitive drum. The Oldham coupling is for transmitting the second rotational driving force to the developing roller with a deviation permitted between an axis of the second main assembly drive transmission member provided on one axial end of the developing roller and an axis of the developing roller. The Oldham coupling includes a driving side engaging portion for engaging with the second main assembly drive transmission member when the process cartridge is mounted to the main assembly of the apparatus, a following side engaging portion fixed to the developing roller, and an intermediary engaging portion which is engaged with the driving side engaging portion and with the following side engaging portion and which is movable with the engagement maintained with the driving side engaging portion and with the following side engaging portion when the developing unit moves between the contact position and the spaced position in a state in which the driving side engaging portion is in engagement with the second main assembly drive transmission member.

According to a further aspect of the present invention, there is provided an electrophotographic image forming apparatus for forming an image on a recording material, comprising (i) a rotatable first main assembly drive transmission member and a rotatable second main assembly drive transmission member; (ii) a process cartridge mounted detachably to the main assembly of the apparatus of the electrophotographic image forming apparatus; and (iii) feeding means for feeding the recording material. The process cartridge includes an electrophotographic photosensitive drum, a drum unit, a developing unit, a drum coupling member, and a shaft coupling member. The drum unit comprises the electrophotographic photosensitive drum. The developing roller is for developing an electrostatic latent image formed on the electrophotographic photosensitive drum with a developer. The developing unit comprises the developing roller and is movably connected with the drum unit. The developing unit is movable relative to the drum unit between a contact position in which the developing roller is contacted to the electrophotographic photosensitive drum and a spaced position in which the developing roller is spaced from the electrophotographic photosensitive drum. The drum coupling member is provided on one axial end of the electrophotographic photosensitive drum, for engaging with the first main assembly drive transmission member and transmitting a first rotational driving force to the electrophotographic photosensitive drum, when the process cartridge is mounted to the main assembly of the apparatus along an axial direction of the electrophotographic photosensitive drum. The shaft coupling member is provided on one axial end of the developing roller, for transmitting a second rotational driving force with a deviation permitted between an axis of the second main assembly drive transmission member and an axis of the developing roller, in which the shaft coupling member includes an engaging portion for engaging with the second main assembly drive transmission member and receiving the second rotational driving force, when the process cartridge is mounted to the main assembly of the apparatus. The engaging portion is movable in a direction crossing the axial direction of the developing roller. When the process cartridge enters the main assembly of the apparatus with the developing unit positioned in the spaced position, an axis of the engaging portion is deviated from the axis of the developing roller with respect to the crossing direction.

According to a further aspect of the present invention, there is provided an electrophotographic image forming apparatus for forming an image on a recording material, comprising (i) a rotatable first main assembly drive transmission member and a rotatable second main assembly drive transmission member; (ii) a process cartridge mounted detachably to the main assembly of the apparatus of the electrophotographic image forming apparatus; and (iii) feeding means for feeding the recording material. The process cartridge includes an electrophotographic photosensitive drum, a drum unit, a developing roller, a developing unit, a drum coupling member, and an Oldham coupling. The drum unit comprises the electrophotographic photosensitive drum. The developing roller is for developing an electrostatic latent image formed on the electrophotographic photosensitive drum with a developer. The developing unit comprises the developing roller and is movably connected with the drum unit. The developing unit is movable relative to the drum unit between a contact position in which the developing roller is contacted to the electrophotographic photosensitive drum and a spaced position in which the developing roller is spaced from the electrophotographic photosensitive drum. The drum coupling member is provided on one axial end of the electrophotographic photosensitive drum, for engaging with the first main assembly drive transmission member and transmitting a first rotational driving force to the electrophotographic photosensitive drum, when the process cartridge is mounted to the main assembly of the apparatus along an axial direction of the electrophotographic photosensitive drum. The Oldham coupling is for transmitting the second rotational driving force to the developing roller with a deviation permitted between an axis of the second main assembly drive transmission member provided on one axial end of the developing roller and an axis of the developing roller, The Oldham coupling includes a driving side engaging portion for engaging with the second main assembly drive transmission member when the process cartridge is mounted to the main assembly of the apparatus, a following side engaging portion fixed to the developing roller, and an intermediary engaging portion which is engaged with the driving side engaging portion and with the following side engaging portion and which is movable with the engagement maintained with the driving side engaging portion and with the following side engaging portion when the developing unit moves between the contact position and the spaced position in a state in which the driving side engaging portion is in engagement with the second main assembly drive transmission member.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

The preferred embodiments of the present invention will be described in conjunction with the accompanying drawings.

Embodiment 1

Referring to FIG. 1-FIG. 20, FIG. 24-FIG. 28, the process cartridge and the electrophotographic image forming apparatus according to an embodiment of the present invention will be described.

Figure 1:
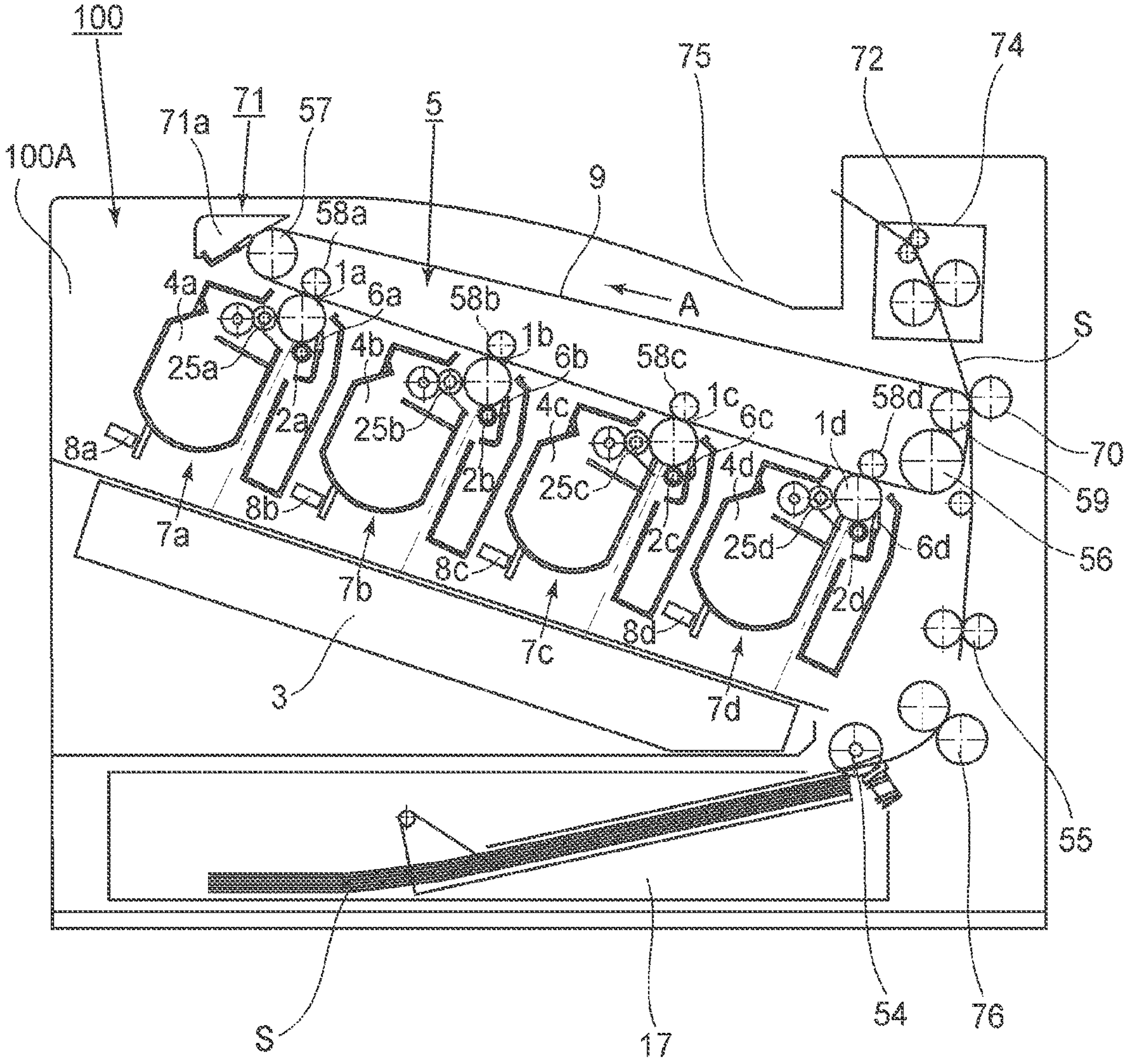
FIG. 1 is a general arrangement of a color electrophotographic image forming apparatus according to Embodiment 1 of the present invention.

FIG. 1 illustrates a general arrangement of the color electrophotographic image forming apparatus according to this embodiment.

(General Arrangement of Image Forming Apparatus)

FIG. 1 shows a general arrangement of an electrophotographic image forming apparatus (hereinafter, image forming apparatus) 100. As shown in FIG. 1, four detachably mountable process cartridges 7 (7a, 7b, 7c, 7d) are mounted by mounting members (unshown). In FIG. 1, the process cartridges 7 are inclined relative to the horizontal direction in the main assembly 100A of the apparatus 100.

Each process cartridge 7 has an electrophotographic photosensitive member drum (hereinafter, photosensitive drum) 1 (1a, 1b, 1c, 1d). Around the photosensitive drum 1 of the process cartridge 7, there are provided process means, such as a charging roller 2 (2a, 2b, 2c, 2d), a developing roller 25 (25a, 25b, 25c, 25d), and a cleaning member 6 (6a, 6b, 6c, 6d), are provided integrally. The charging roller 2 has a function of charging the surface of the photosensitive drum 1 uniformly. The developing roller 25 has a function of developing, with the toner, a latent image formed on the photosensitive drum 1 into a visualized image. The cleaning member 6 removes the toner which remains on the photosensitive drum 1, after the developer image formed on the photosensitive drum 1 is transferred onto a recording material.

A scanner unit 3 for forming the latent image on the photosensitive drum 1 by exposing the photosensitive drum 1 selectively on the basis of the image information, is provided in a lower part of the process cartridge 7.

A cassette 17, which contains the recording materials S is provided in a lower position of the main assembly 100A of the apparatus 100. A recording material feeding means is provided so that the recording material S passes through a secondary transfer roller 70 portion and a fixing portion 74 to the upper portion of apparatus main assembly 100A. In the detail, it comprises a feeding roller 54 for carrying out the separation and feeding of the recording materials S from the cassette 17 one by one. It further comprises a conveying roller pair 76 for feeding the fed recording material S, and a resist roller pair 55 for synchronizing the transfer of the latent image formed on the photosensitive drum 1 with the movement of the recording material S. In an upper part of the process cartridge 7 (7a, 7b, 7c, 7d), an intermediary transfer unit 5 as the intermediary transfer means for transferring the toner images formed on the photosensitive drums 1 (1a, 1b, 1c, 1d), is provided. The intermediary transfer unit 5 comprises a driving roller 56 and a follower roller 57. It further comprises primary transfer rollers (58a, 58b, 58c, 58d) provided in the position opposed to the photosensitive drum 1 for each color, and an opposing roller 59 opposed to a secondary transfer roller 70, respectively. A transfer belt 9 is extended around the rollers. The circulative movement of the transfer belt 9 is carried out contacting all of the photosensitive drums 1. By applying a voltage to the primary transfer rollers (58a, 58b, 58c, 58d), the toner images are transferred primarily onto the transfer belt 9 from the photosensitive drums 1. The voltage is applied between the opposition 59 roller disposed in the transfer belt 9, and the secondary transfer roller 70 to transfer the toner image from the transfer belt 9 onto the recording material S.

Each photosensitive drum 1 is rotated in the image forming operation and the drum 1 is charged uniformly by the charging roller 2. Subsequently, the photosensitive drum 1 is selectively exposed with the scanner unit 3. By doing so, an electrostatic latent image is formed on the photosensitive drum 1. The latent image is developed by the developing roller 25. This forms the color developer image on each photosensitive drum 1. In synchronism with this image formation, a resist roller pair 55 feeds the recording material S to the secondary transfer position where the opposing roller 59 and the secondary transfer roller 70 are opposed to each other with the transfer belt 9 therebetween. An image transfer bias voltage is applied to the secondary transfer roller 70 to transfer the secondary color developer images on the transfer belt onto the recording material S. By doing so, a color image is formed on the recording material S. The recording material S, which has the formed color image thereon, is heated and pressed by the fixing portion 74, so that the developer image is fixed. Thereafter, the recording material S is discharged to the discharging portion 75 by the discharging roller 72. The fixing portion 74 is disposed in the upper position of the main assembly 100A of the apparatus 100.

(Process Cartridge)

Figure 2:
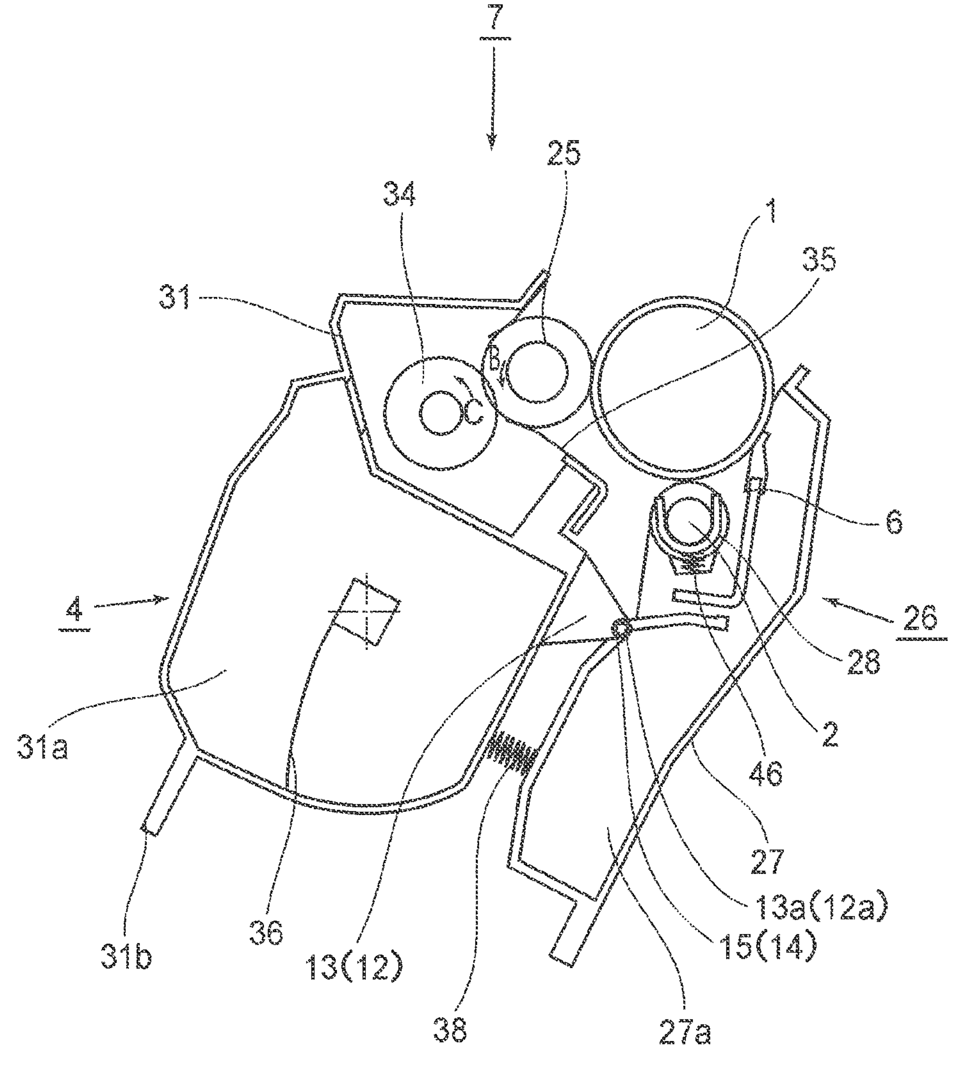
FIG. 2 is a cross-sectional illustration of a process cartridge according to Embodiment 1.
Figure 3:
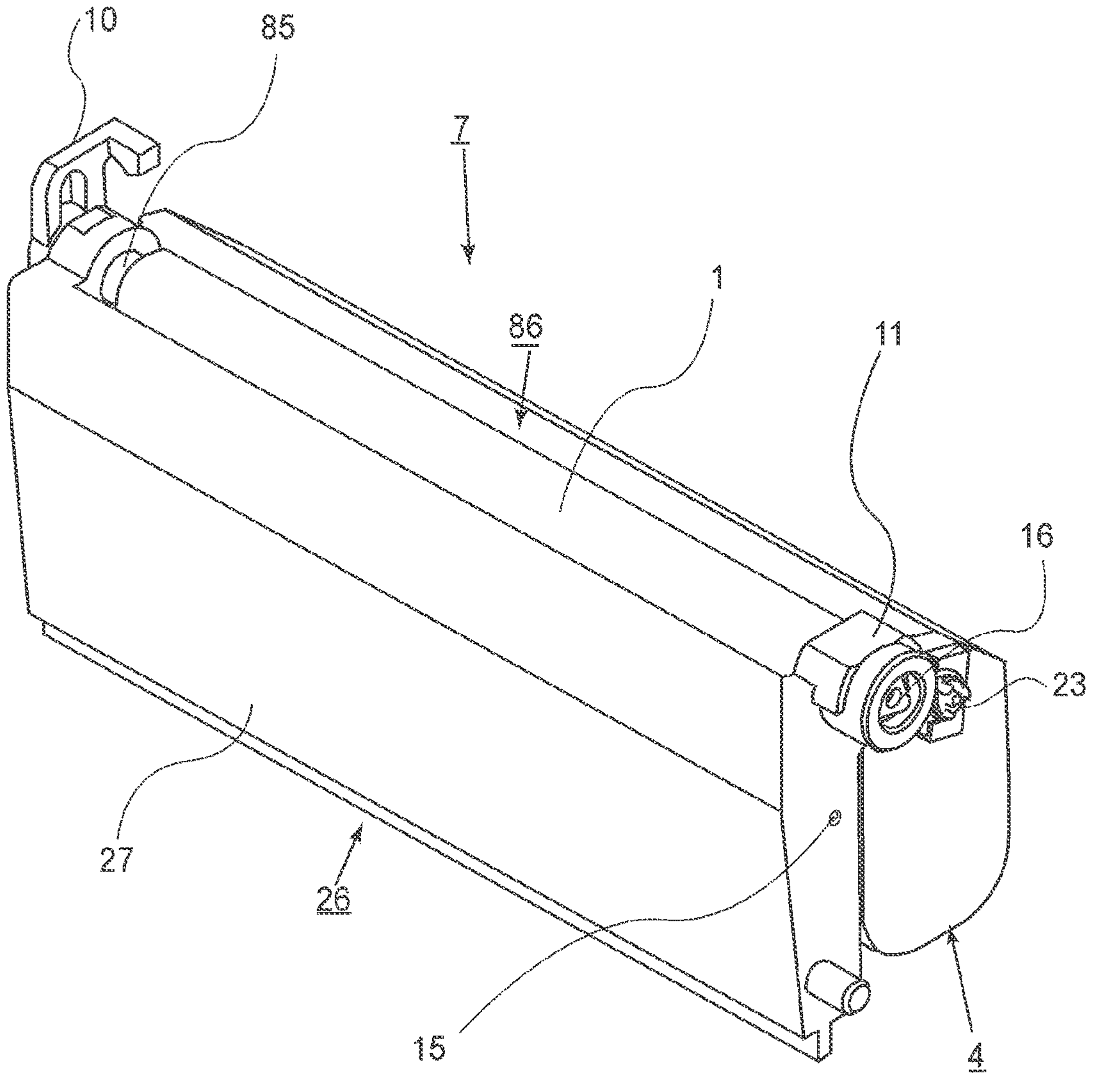
FIG. 3 is an outer appearance perspective view of the process cartridge according to Embodiment 1.
Figure 4:
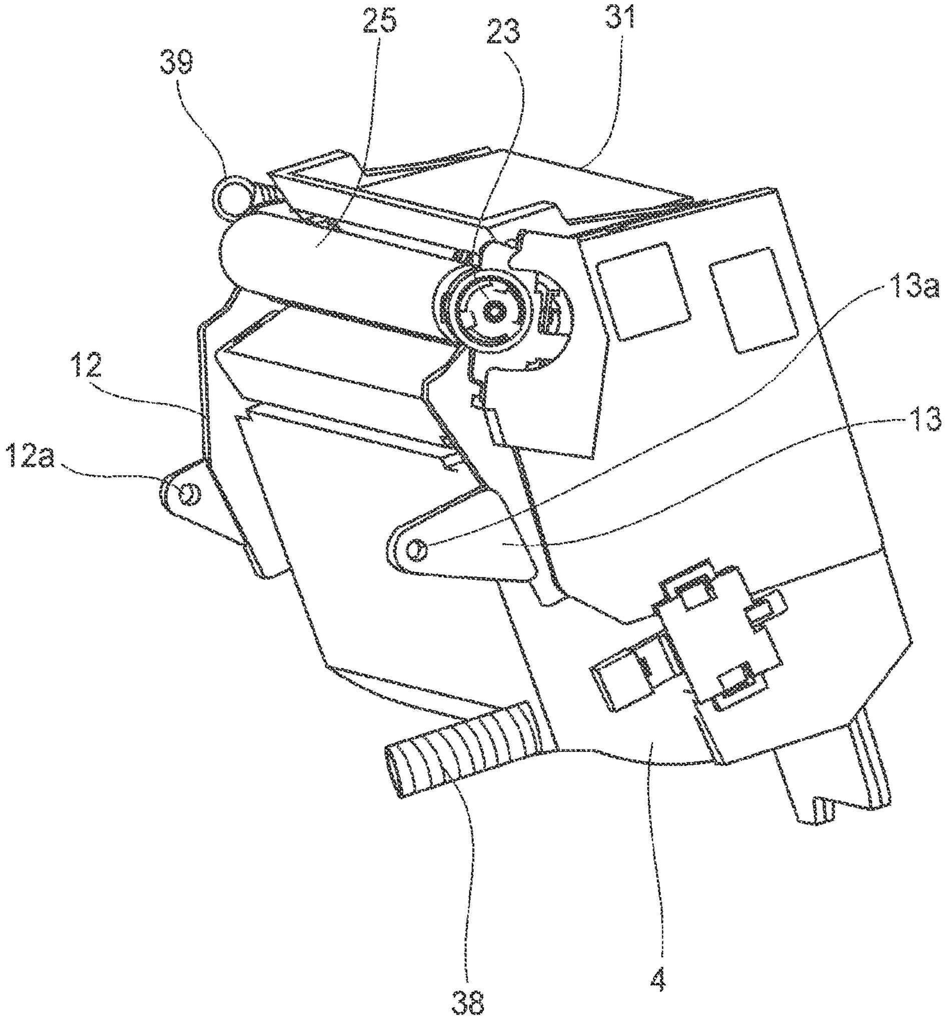
FIG. 4 is a perspective view of a developing unit according to Embodiment 1.

Referring to FIG. 2-FIG. 4, the process cartridge 7 of this embodiment will be described. FIG. 2 is a major section of the process cartridge 7 which contains the developer (hereinafter, toner). A cartridge 7 which contains the toner of the yellow color, a cartridge 7b which contains the toner of a magenta color, a cartridge 7c which contains the toner of the cyan color, and a cartridge 7d which contains the toner of the black color, have the same structures.

Each process cartridge 7 (7a, 7b, 7c, 7d) includes a drum unit 26 as a first frame, and a developing unit 4 (4a, 4b, 4c, 4d) as a second frame. The drum unit 26 is provided with the photosensitive drum 1 (1a, 1b, 1c, 1d), and the charging roller 2 (2a, 2b, 2c, 2d) and the cleaning member 6 (6a, 6b, 6c, 6d). And, the developing unit 4 is provided with a developing roller 25.

The drum unit 26 includes a cleaning frame 27 and the photosensitive drum 1 is rotatably mounted to it through a drum-front bearing 10 and a drum-rear bearing 11 (FIG. 3). The end of the photosensitive drum 1 is provided with the drum coupling 16 and the flange 85.

Around the photosensitive drum 1, as mentioned above, the charging roller 2 and the cleaning member 6 are disposed. The residual toner removed by the cleaning member 6 from the photosensitive drum 1 surface is allowed to fall in a removed toner chamber 27a. A driving force is transmitted to the drum unit 26 from a main assembly driving motor (unshown) as a driving source, so that the photosensitive drum 1 is rotated correspondingly to the image forming operation process. The charging roller 2 is rotatably mounted to the cleaning frame 27 through the charging roller bearings 28. And, it is pressed by a charging roller pressing member 46 toward the photosensitive drum 1, by which it is rotated by the photosensitive drum 1.

The developing unit 4 comprises a developing roller 25, which contacts the photosensitive drum 1 and is rotated in the direction of arrow B, and a developing device frame 31 for supporting the developing roller 25. The developing roller 25 is rotatably supported on the developing device frame 31 through a developing-device-front bearing 12 and a developing-device-rear bearing 13 which are mounted to the respective sides of the developing device frame 31 (FIG. 4). A toner supplying roller 34 rotates in the direction of arrow C, contacting the outer periphery of the developing roller 25. A developing blade 35 regulates the toner layer thereon, contacting the outer periphery of the developing roller 25. In the toner accommodating portion 31a of the developing device frame 31, the toner feeding member 36 for agitating the contained toner and for feeding the toner to the toner supplying roller 34 is provided.

FIG. 3 is an outer appearance perspective view of the process cartridge 7. The developing unit 4 is rotatably mounted to the drum unit 26. A front supporting pin 14 and a rear supporting pin 15, which are press-fitted in the cleaning frame 27, are engaged into the hanging holes 12*a* and 13*a* of the developing-device-front bearing 12 and the developing-device-rear bearing 13. By doing so, the developing unit 4 is rotatably supported about the axis of the supporting pins 14 and 15 to the cleaning frame 27 (FIG. 2). The cleaning frame 27 is provided with a drum-front bearing 10 and a drum-rear bearing 11 for supporting the photosensitive drum 1 rotatably. The drum-rear bearing 11 supports a drum coupling 16 connected with the photosensitive drum 1. The drum-front bearing 10 supports the flange 85. The drum coupling 16 transmits the rotational driving force (first rotational driving force) to the photosensitive drum 1 from the main assembly 100A of the apparatus 100.

The developing unit 4 shown in FIG. 4 is urged to the drum unit 26 by a pressing spring 38 provided in the developing device frame 31, and a tension spring 39 provided in the developing-device-front bearing 12, during the image formation of the process cartridge 7. The developing roller 25 is revolved by the pressing springs 38 and the tension spring 39 about the holes 12*a* and 13*a* of the developing-device-front bearing 12 and the developing-device-rear bearing 13, so that it is contacted to the photosensitive drum 1.

In a contact-type developing system which effects development by contact between the photosensitive drum 1 and the developing roller 25, it is desirable that the photosensitive drum 1 is a rigid member and the developing roller 25 is an elastic member. This elastic member may be a solid rubber monolayer, and it may have the solid rubber layer and a resin material coating thereon in consideration of the charging application property to the toner.

The image forming operation of the process cartridge 7 will be described (FIG. 1 and FIG. 2). When the image information is supplied to the image forming apparatus 100, the main assembly driving motor (unshown) starts the rotation and the rotational driving forces are transmitted to the photosensitive drum 1, to the developing roller 25, to the toner supplying roller 34, and to the toner feeding member 36. The charging bias voltage is applied to the charging roller 2 from the main assembly 100A of the apparatus 100 to charge electrically the surface of the photosensitive drum 1 uniformly. Corresponding to the image information, the exposure is effected by the scanner unit 3, so that a latent image is formed on the photosensitive drum 1.

The toner in the toner accommodating portion 31*a* is fed by the rotation of the toner feeding member 36 to the toner supplying roller 34. The toner supplying roller 34 rotates to supply the toner to the outer periphery of the rotating developing roller 25. The supplied toner is triboelectrically charged by the developing blade 35 on the outer periphery of the developing roller 25. The developing bias voltage is applied to the developing roller 25 from the voltage source portion (unshown) provided in the image forming apparatus 100. By doing so, the electrostatic latent image formed on the photosensitive drum 1 is developed. Here, the developing roller 25 is provided opposed to the photosensitive drum 1. The developing roller 25 is contacted to the photosensitive drum 1 and develops the electrostatic latent image formed on the photosensitive drum 1.

(Mechanism for Mounting Process Cartridge to Main Assembly of Image Forming Apparatus)

Figure 5:
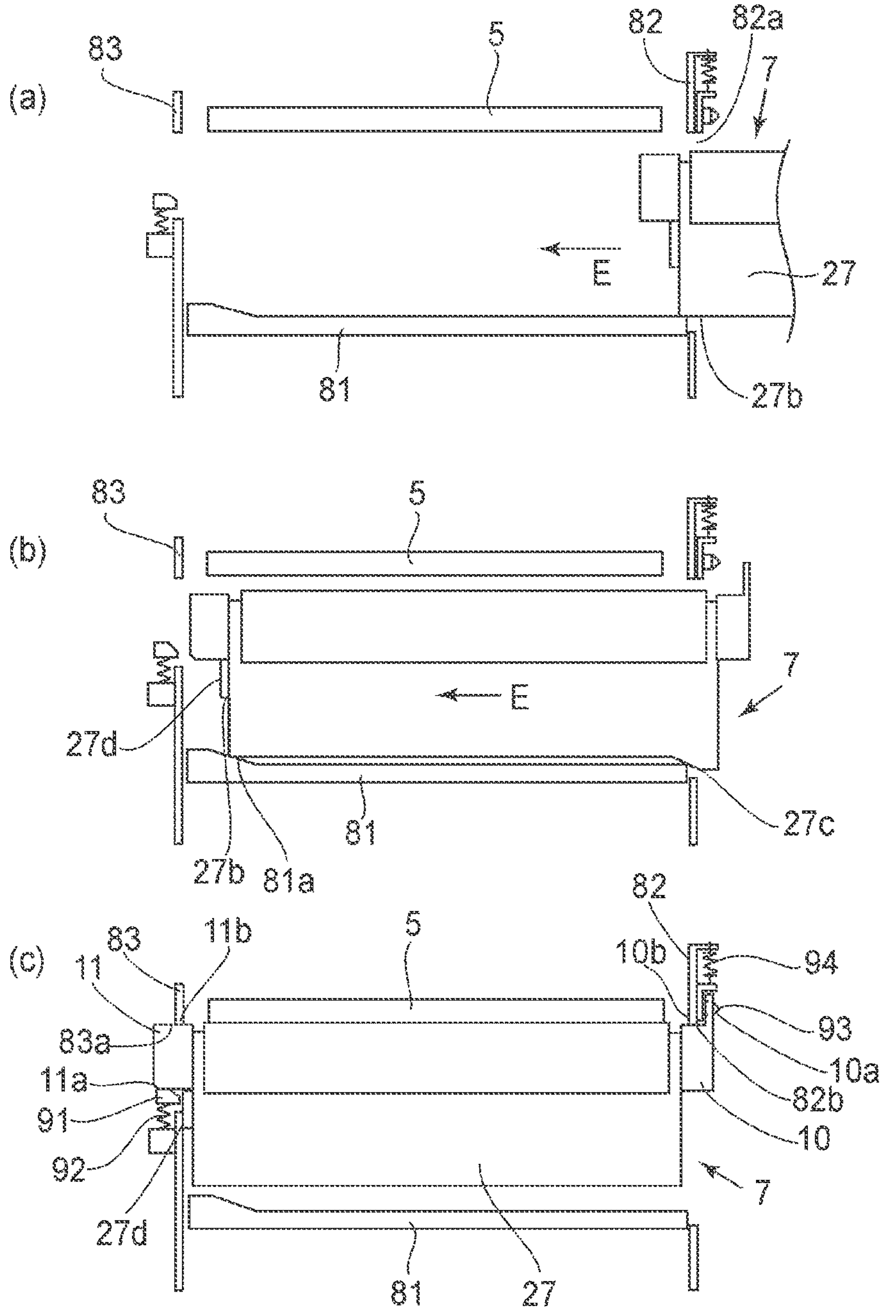
FIG. 5 is a schematic illustration which illustrates a mounting operation of the process cartridge relative to the main assembly of the image forming apparatus by Embodiment 1.

Referring to FIG. 5, the mounting mechanism, according to this embodiment, for mounting the process cartridge 7 in the apparatus main assembly 100A will be described.

In FIG. 5, (a) illustrates a state before the setting, in the apparatus main assembly 100A, of the process cartridge 7. In the state of (a), the process cartridge 7 is mounted in the direction of arrow E through an opening 82*a* provided in a front side plate 82 of the apparatus main assembly 100A. In that case, a guide portion 27*b* integrally provided in the cleaning frame 27 of the process cartridge 7 is guided on a main assembly guide member 81 provided in the main assembly 100A of the apparatus 100. The main assembly guide member 81 is the mounting member for mounting the process cartridge 7 dismountably.

In FIG. 5, (b) illustrates the state where the mounting of the process cartridge 7 to the apparatus main assembly 100A is starting to be, but not yet completed. The guiding member 81 provided in the main assembly 100A of the apparatus 100 is provided with an inclined portion 81*a* inclined upwardly in the downstream direction with respect to the mounting direction. The cleaning frame 27 is provided with a downwardly inclined portion 27*c* in an upstream end thereof with respect to the mounting direction. When the process cartridge 7 is mounted to the apparatus main assembly 100A, the guide portion 27*b* of the cleaning frame 27 rides on the inclined portion 81*a*, and the inclined portion 27*c* rides on the main assembly guide portion 81. By doing so, the process cartridge 7 is displaced toward the intermediary transfer unit 5 (upwardly).

In FIG. 5, (c) illustrates the state where the process cartridge is mounted to the main assembly 100A of the apparatus 100. When the mounting operation of the process cartridge 7 is further continued in after the process cartridge 7 moves toward the intermediary transfer unit 5, the abutting portion 27*d* provided integrally on the cleaning frame 27 contacts to a rear side plate 83 of the apparatus main assembly 100A. By doing so, the mounting of the process cartridge 7 to the image forming apparatus 100 is completed.

In this state, a portion-to-be-urged 11*a* of the drum-rear bearing 11 contacts the back pressed member 91 provided in the rear side plate 83, so that it is upwardly pushed by the pressing spring 92. And, the cartridge positioning portion 11*b* provided in the upper position of the drum-rear bearing 11 contacts the abutting portion 83*a*, which functions as the main assembly positioning portion, of the rear side plate 83, by which the process cartridge 7 is positioned relative to the apparatus main assembly 100A in the rear side.

In addition, a portion-to-be-pulled 10*a* of the drum-front bearing 10 engages with the pulling member 93 provided in the front side plate 82. The pulling member 93 is upwardly raised by a tension spring 94 provided on the front side plate 82, and by doing so, the portion-to-be-pulled 10*a* is also upwardly raised. And, an abutting portion 10*b*, which is cartridge positioning portion for the drum-front bearing 10, contacts a positioning portion 82*b*, which is the main assembly positioning portion of the main assembly front side plate 82, so that the process cartridge 7 is positioned relative to the apparatus main assembly 100A in the front side thereof.

Figure 6:
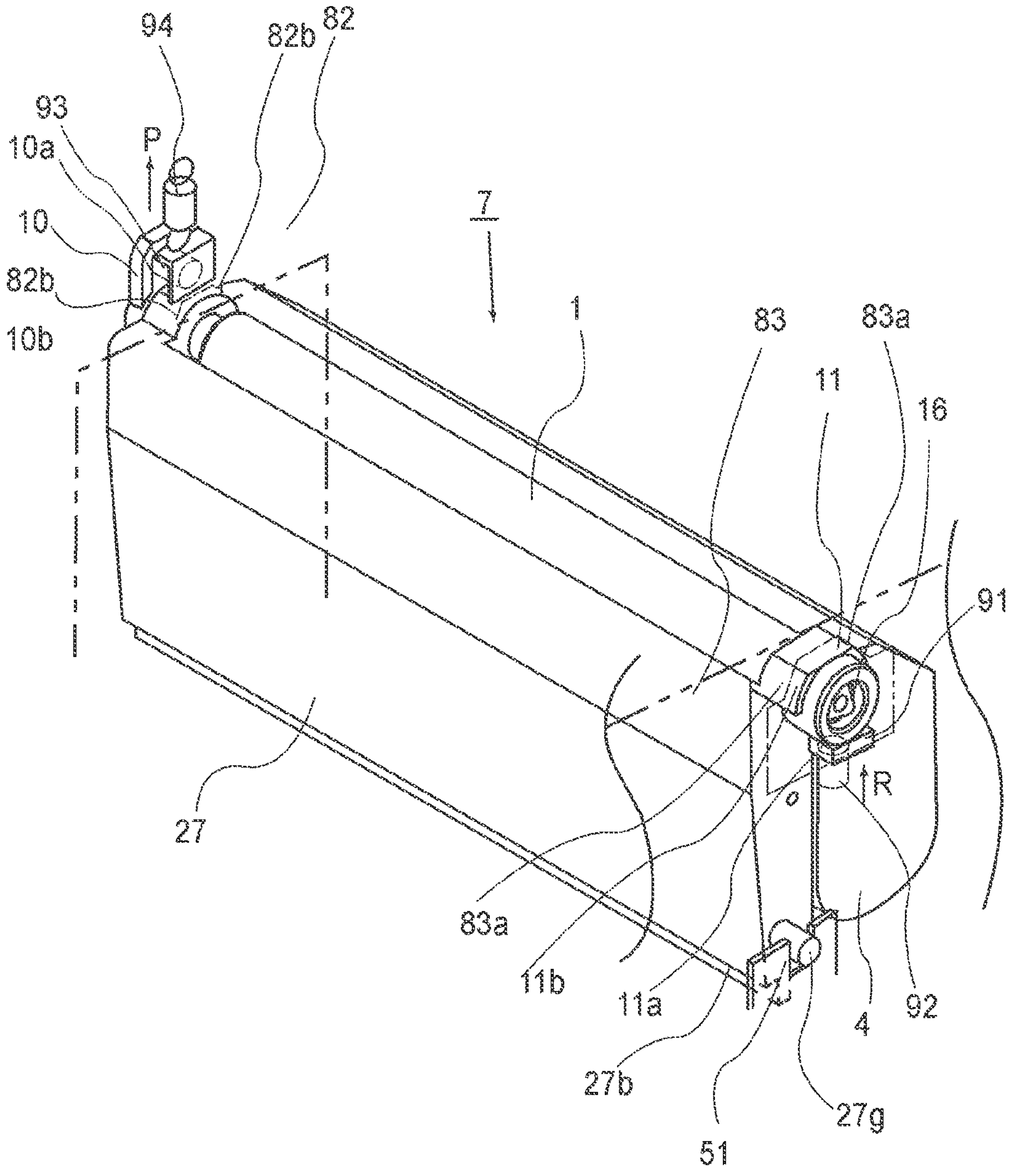
FIG. 6 is a perspective view of the process cartridge positioned in the main assembly of the image forming apparatus in Embodiment 1.

As shown in FIG. 6, the abutting portion 83*a* has a substantially V shaped configuration, and contacts the positioning surface 11*b* of the drum-rear bearing 11. The drum-front bearing 10 is pulled in the direction of the arrow P by the locking with the portion-to-be-pulled 10*a* of the drum-front bearing 10 of the pulling member 93 provided in the front side plate 82. Relating to positioning, it is contacted to the drum positioning portion 82*b* which is provided in the front side plate 82 and which has a substantially V configuration, similarly to the case of the drum-rear bearing 11. The pressure required for the positioning, relative to the main assembly 100A of the apparatus 100, of the drum-front bearing 10 and the drum-rear bearing 11, is applied in the direction of the arrows P and R. Therefore, the process cartridge 7 is positioned, namely the drum-front bearing 10 and the drum-rear bearing 11, which support the photosensitive drum 1 rotatably can be correctly positioned relative to the main assembly 100A of the apparatus 100. In addition, the cleaning frame 27 is provided with a boss 27*g*, which functions as a rotation stopper for the process cartridge 7 on the side surface, and the boss 27*g* engages the rotation stopper receptor member 51 provided in the apparatus main assembly 100A. By doing so, the rotation in the apparatus main assembly 100A of the process cartridge 7 is prevented. For easy understanding of the description, the driving side engaging portion 23 is omitted in FIG. 6.

(Mechanism for Spacing Between Photosensitive Drum and Developing Roller in Process Cartridge)

Figure 7:
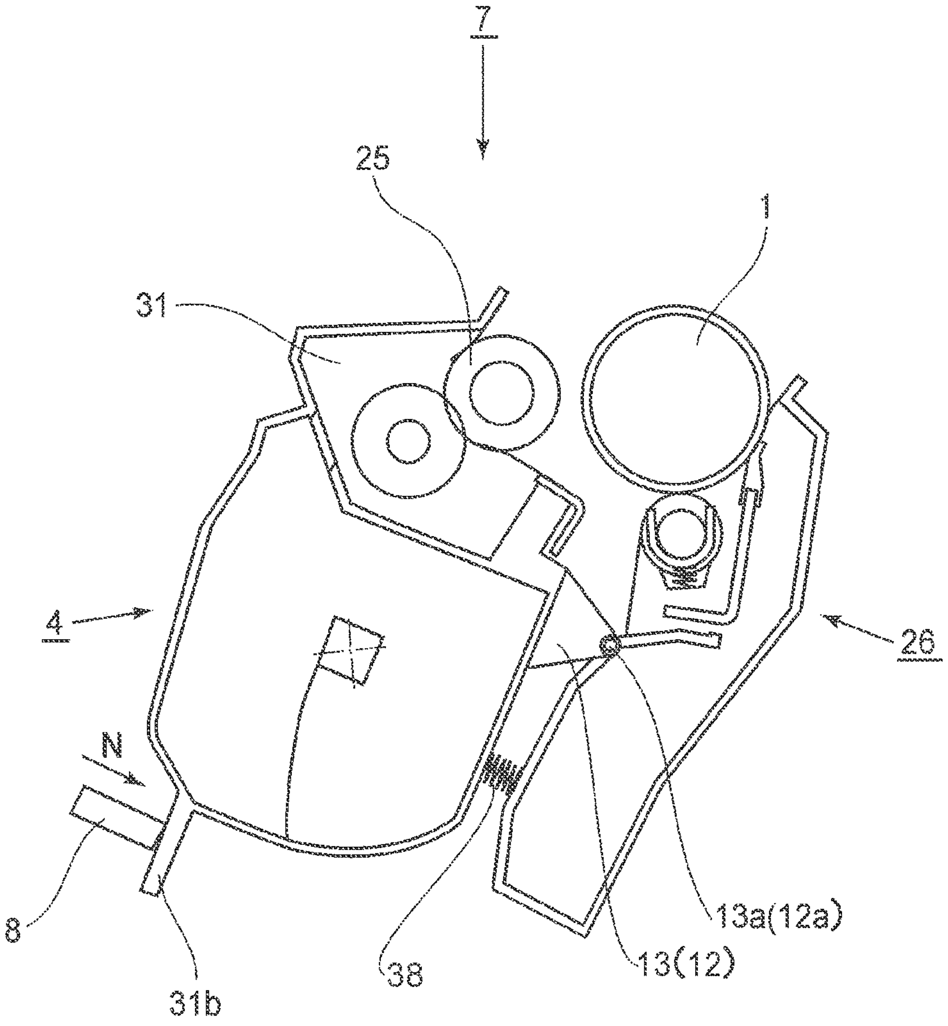
FIG. 7 is a sectional view which illustrates a developing device spacing operation in Embodiment 1.
Figure 8:
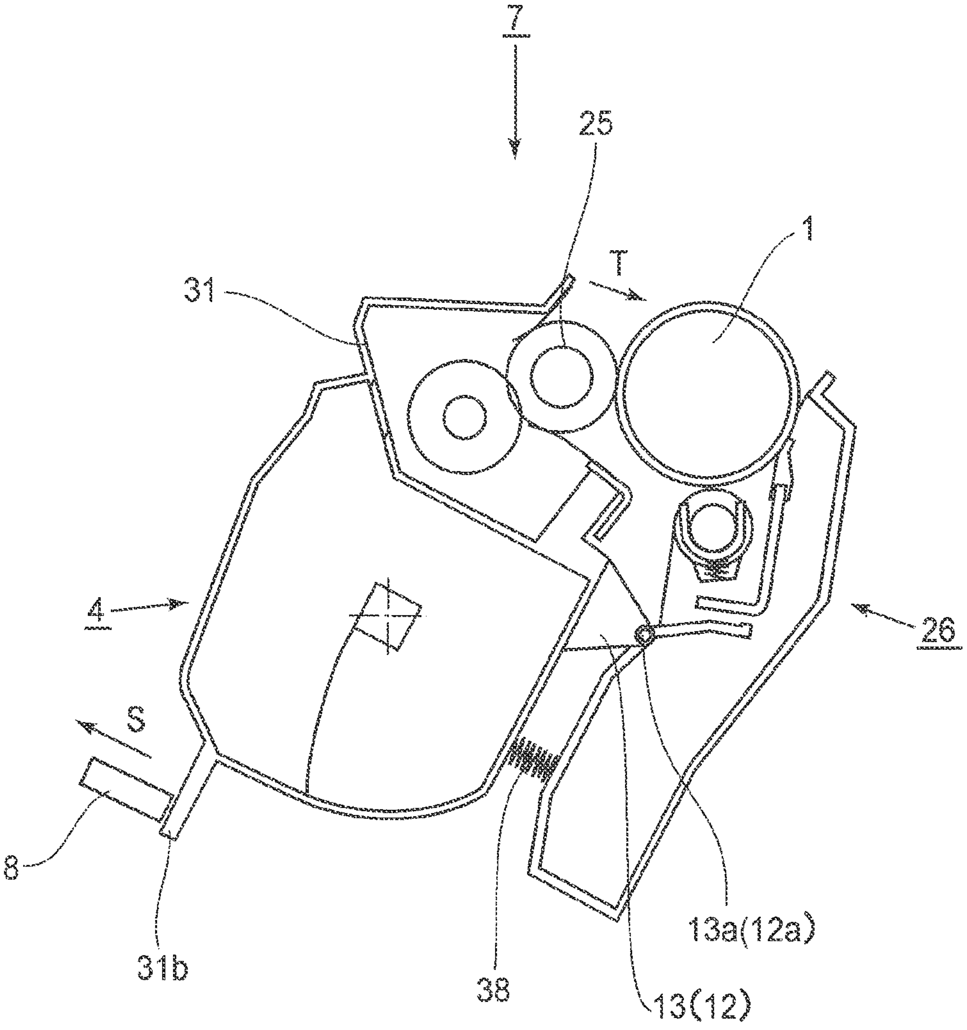
FIG. 8 is a sectional view which illustrates a developing device contacting operation in Embodiment 1.

Referring to FIG. 7-FIG. 11, a spacing mechanism between the photosensitive drum 1 and the developing roller 25 in the process cartridge 7 of this embodiment will be described. In FIG. 7, the image forming apparatus 100 (unshown) is provided with a spacer member 8 in a predetermined position with respect to the longitudinal direction of the process cartridge 7. The developing unit 4 of the process cartridge 7 receives a force in a direction of arrow N from the movable spacer member 8 at a force receiving portion 31*b* of the developing device frame 31, so that the developing roller 25 is spaced from the photosensitive drum 1 (spaced position). As shown in FIG. 8, when the spacer member 8 is moved in the direction of an arrow S and it disengages from the force receiving portion 31, the developing unit 4 is rotated in a direction of arrow T by the urging forces of a pressing spring 38 and a tension spring (unshown) about the holes 12*a* and 13*a* of the developing-device-front bearing 12 and the developing-device-rear bearing 13. By doing so, the developing unit 4 moves to a contact position, and the developing roller 25 and the photosensitive drum 1 are contacted to each other. The developing unit 4 is retained in the spaced position of FIG. 7 except during the image forming operation, by this spacing structure. By doing so, the influence on the image quality attributable to deformation of the developing roller 4 is suppressed.

(Developing Device Separation Holding Member)

Figure 9:
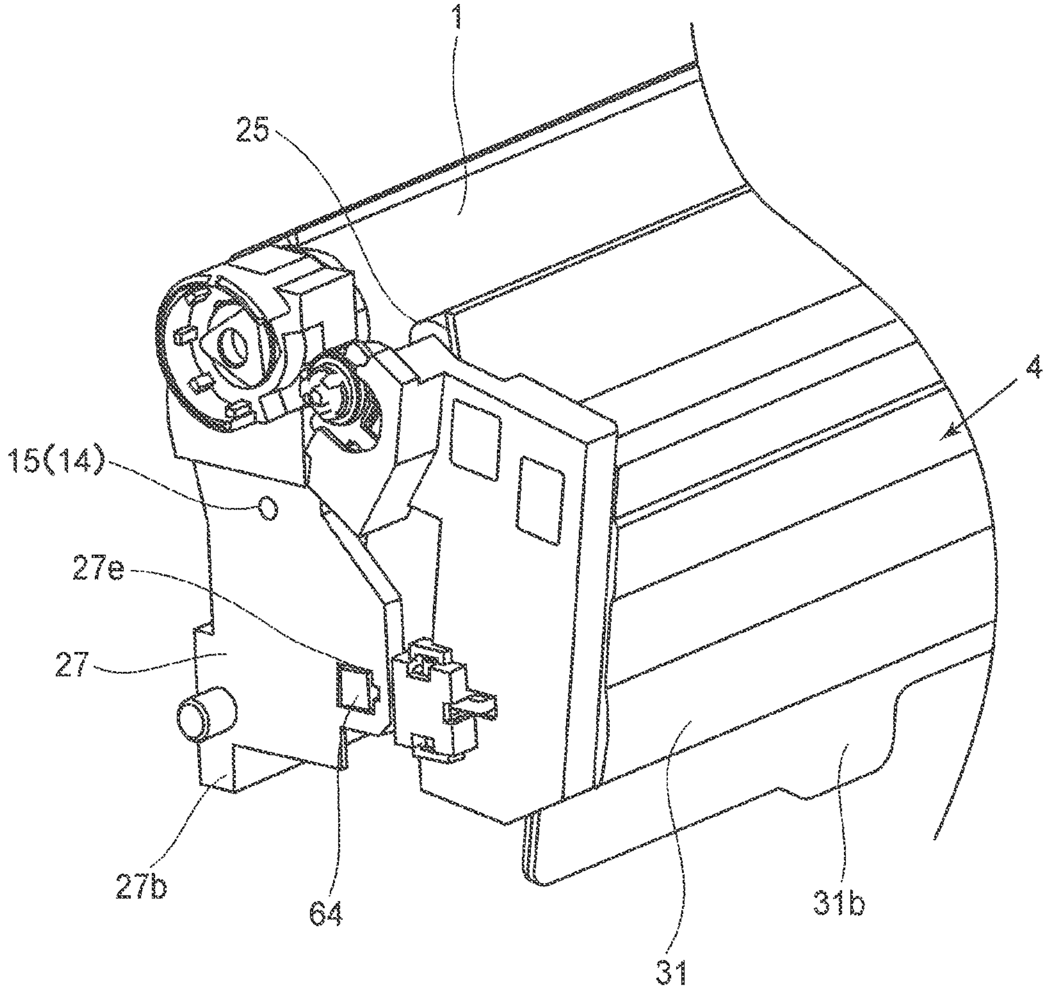
FIG. 9 is a perspective view of the process cartridge in the state before mounting to the main assembly of the image forming apparatus of the process cartridge in Embodiment 1.

FIG. 9 illustrates the initial state before mounting the process cartridge 7 to the main assembly 100A of the apparatus 100 (entrance). In this state, the developing unit 4 is provided with the space holding member 64 for retaining the developing unit 4 in the spaced position by process cartridge 7 alone so that the space holding member 64 locks with the hole 27*e* provided in the side surface of the cleaning frame 27 to retain the developing roller 25 in the state of being spaced from the photosensitive drum 1. The position of the space holding member 64 at this time is an engagement position.

Figure 10:
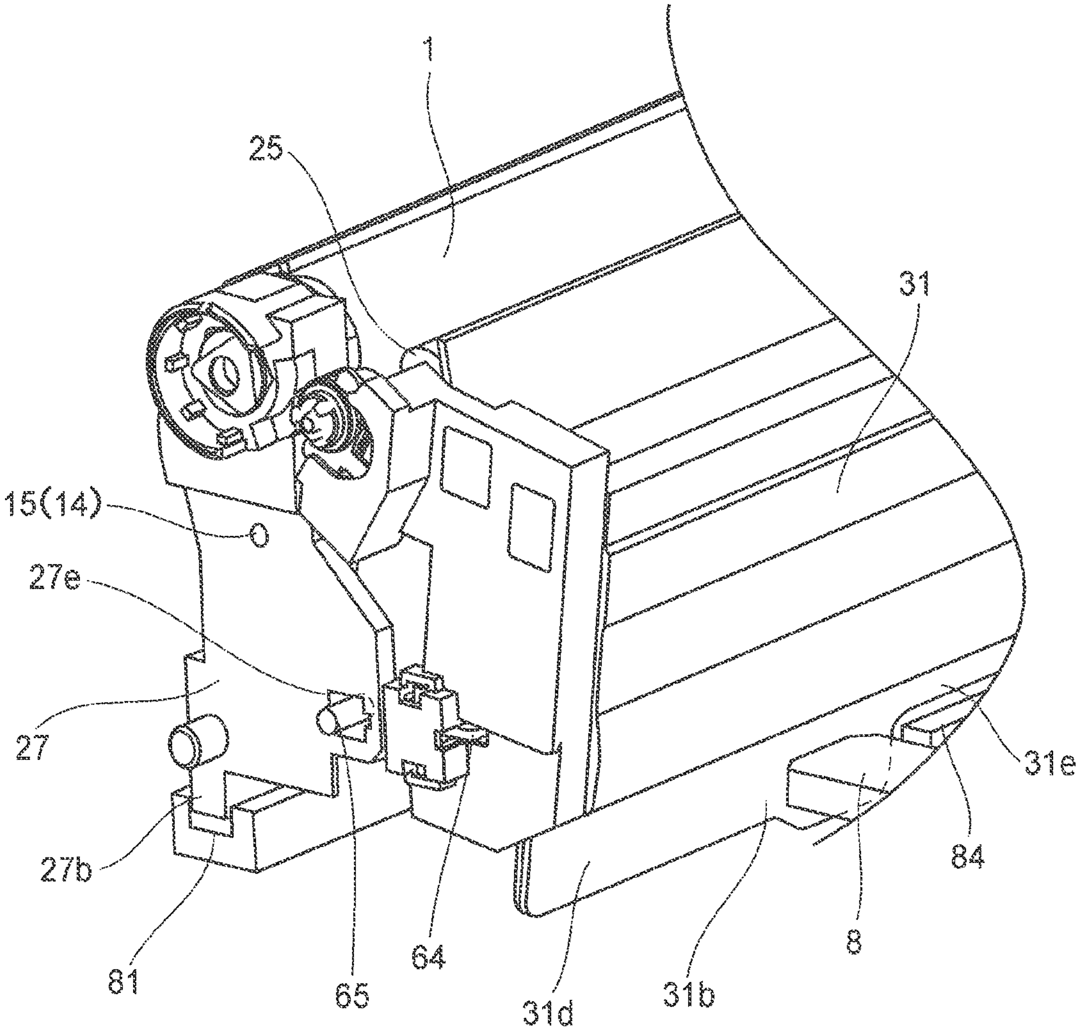
FIG. 10 is a perspective view of the process cartridge which is released the developing device separation member of the process cartridge in the Embodiment 1.

As shown in FIG. 10, when the process cartridge 7 is mounted to the main assembly 100A of the apparatus 100, a main assembly releasing member 65, contacted to the space holding member 64, is provided in the apparatus main assembly 100A. Immediately before the process cartridge 7 is positioned by the main assembly positioning portions 82*b* and 83*a* (FIG. 6 reference) of the main assembly 100A of the apparatus 100, the main assembly releasing member 65 contacts the space holding member 64, by which the locking between the space holding member 64 and the hole 27*e* is released. The position of the space holding member 64 at this time is the releasing position. When the space holding member 64 is released, it enables the developing roller 25 to contact the photosensitive drum 1. Normally, however, in the state where the process cartridge 7 is mounted to the main assembly 100A of the apparatus 100, the spacer member 8 provided in the main assembly 100A of the apparatus 100 contacts the force receiving portion 31*b* of the developing device frame 31 (FIG. 7). For this reason, even if the process cartridge 7 is mounted to the main assembly 100A of the apparatus 100, and the space holding member 64 is released, the developing roller 25 does not contact the photosensitive drum 1 (FIG. 7 reference).

Figure 11:
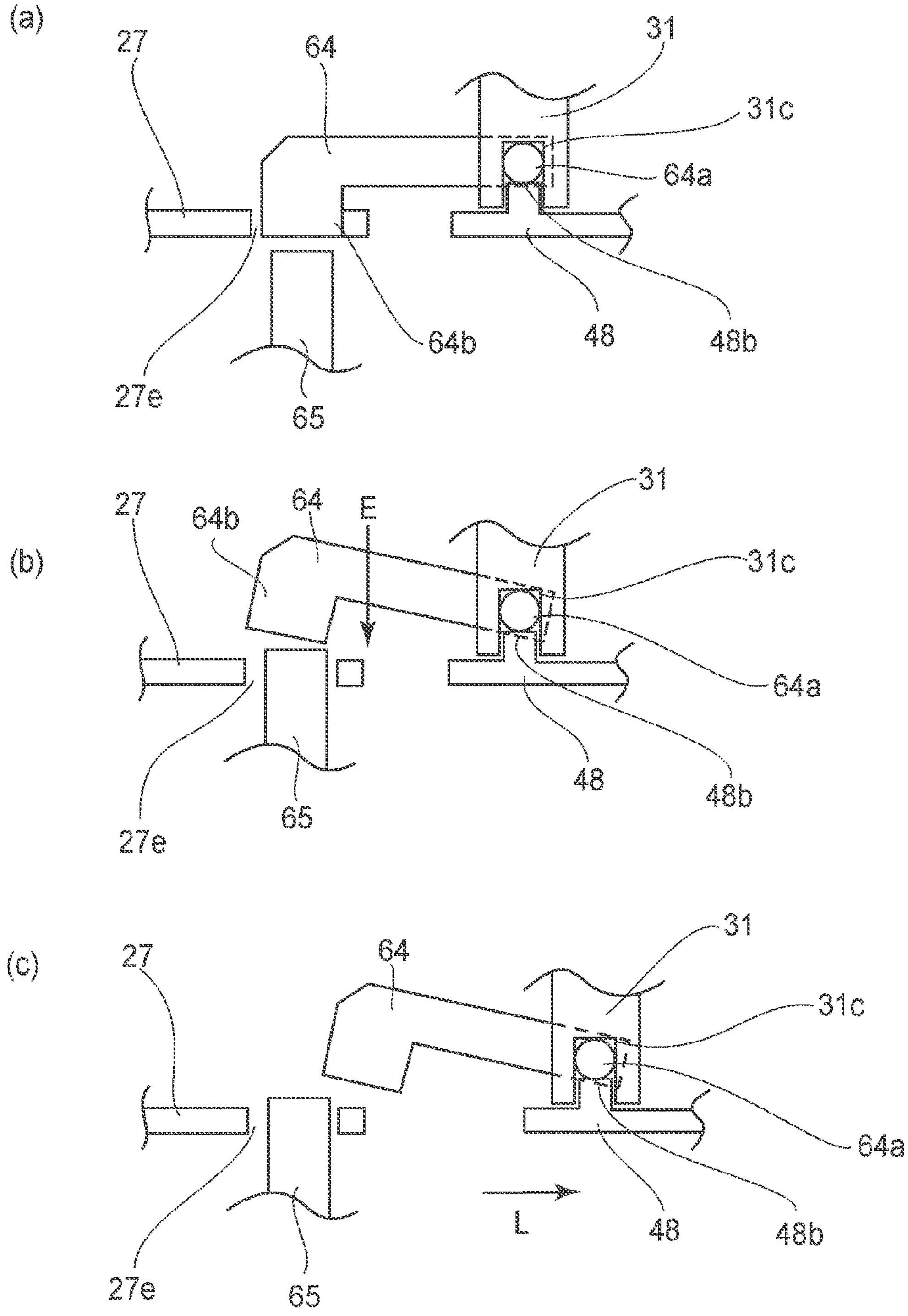
FIG. 11 is an operation illustration of the developing device separation member of the process cartridge in Embodiment 1.

Referring to FIG. 11, the releasing method of the space holding member 64 will be described. As shown in FIG. 11(*a*), the space holding member 64 is provided with a boss 64*a*. The boss 64*a* is rotatably supported in a groove 31*c* formed in the developing device frame 31, and it is confined by a confining portion 48*b* of the side cover 48. An engaging portion 64*b* of the space holding member 64 is locked with a hole 27*e* provided in the cleaning frame 27 again. When the process cartridge 7 is, in this state, moved in the direction of arrow E, as shown in FIG. 11(*b*), the main assembly releasing member 65 is inserted into the hole 27*e* of the cleaning frame 27. The main assembly releasing member 65 contacts the space holding member 64, and the space holding member 64 rotates about the boss 64*a*, so that the space holding member 64 is released from the cleaning frame 27.

As shown in FIG. 11(*c*), the developing device frame 31 becomes movable in the direction of arrow L so that the contact between the unshown photosensitive drum 1 and the unshown developing roller 25 is enabled.

When the image forming operation is started by the printing signal after the mounting operation is completed, the spacer member 8 (FIG. 8 reference) moves in accordance with the development operation timing, in the direction of arrow S, so that the force receiving portion 31*b* and the spacer member 8 are spaced from each other. For this reason, the developing unit 4 is moved to the contact position by the elastic force of the pressing spring 38 and the tension spring 39 (FIG. 4), so that the developing roller 25 is brought into the state in which the developing operation is possible in contact with the photosensitive drum 1.

When the developing operation is completed, the spacer member 8 is again moved in the direction of arrow N of FIG. 7, and it applies the force to the force receiving portion 31*b*. By doing so, the developing unit 4 is moved to the spaced position, so that the photosensitive drum 1 and the developing roller 25 are spaced from each other. This spacing state is maintained except during image formation.

As has been described hereinbefore, the developing unit 4 can select easily the spacing and contact states between the photosensitive drum 1 and the developing roller 25. For this reason, the deformation of the elastic layer can be prevented even if the material of the elastic layer of the developing roller 25 is selected severely.

(Spacing Mechanism for Remounting of Process Cartridge)

Figure 26:
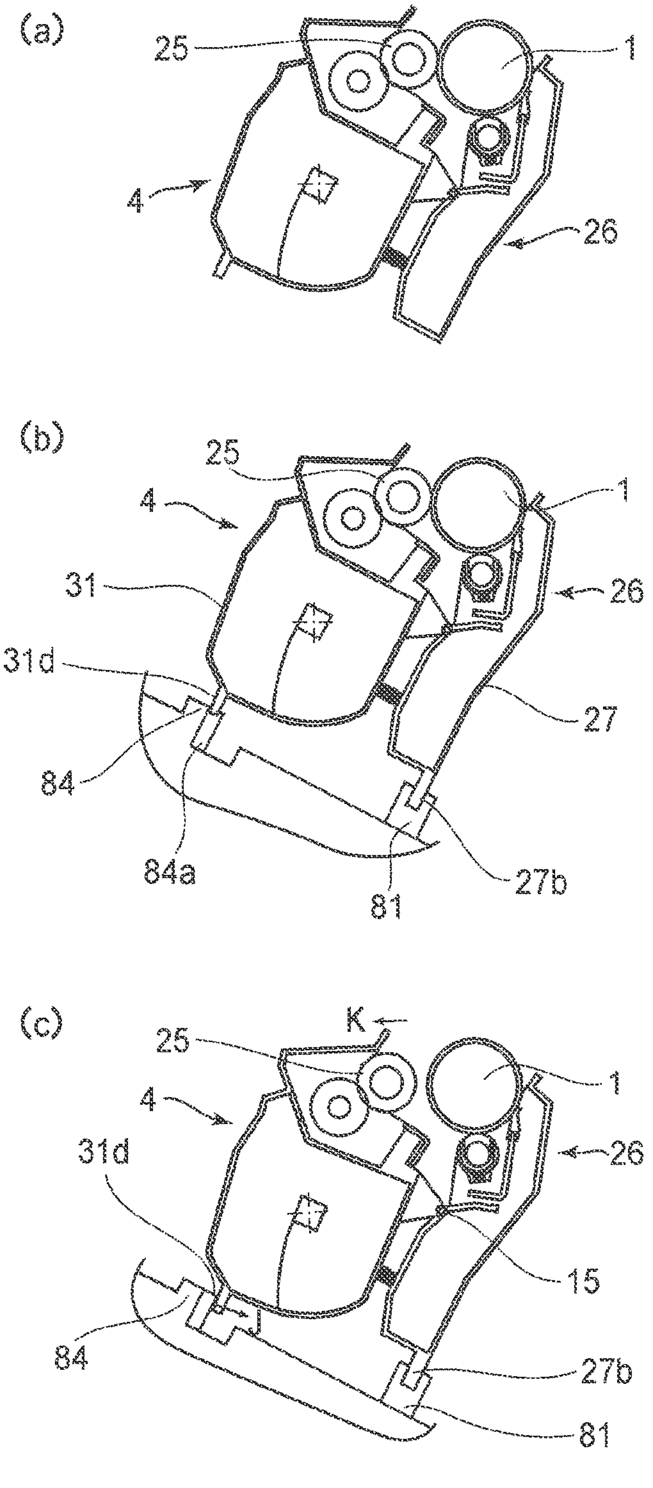
FIG. 26 is a view which illustrates a structure for carrying out remounting of the process cartridge in Embodiment 1 to the main assembly of the image forming apparatus.

A description will be provided about the operation of the spacing mechanism at the time of mounting again the process cartridge 7 having once been taken out of the main assembly 100A of the apparatus 100, to the main assembly 100A of the apparatus 100. The space holding member 64 is released from the hole 27*e* of the cleaning frame 27 in the process cartridge 7, having been taken out of the main assembly 100A of the apparatus 100. For this reason, the developing unit 4 is in the contact position and the photosensitive drum 1 and the developing roller 25 contact each other (FIG. 26(*a*)). In addition, when the process cartridge 7 is demounted from the main assembly 100A of the apparatus 100, the image forming operation of the electrophotographic image forming apparatus 100 has been finished. For this reason, as shown in FIG. 7, in order to maintain the developing unit 4 in the spaced position, the spacer member 8 is in the position contacted to the spacing force receiving portion 31*b*. When the process cartridge 7 is demounted from the main assembly 100A of the apparatus 100 with this state of the force applying portion 8, the developing unit 4 is restored to the contact position as shown in FIGS. 26(*a*) and 27(*a*). In remounting the taken-out process cartridge 7, it is required to move the developing unit 4 to the spaced position again.

Figure 24:
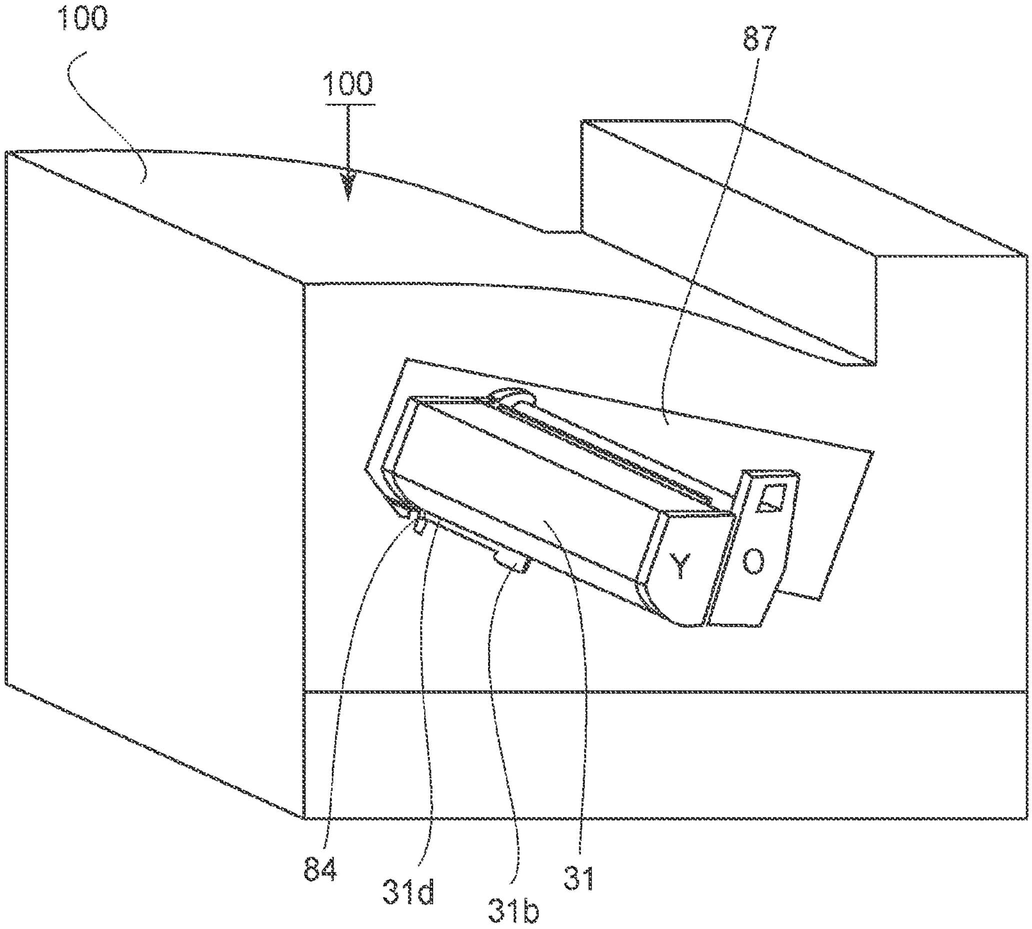
FIG. 24 is a perspective view of a state before carrying out remounting of the process cartridge in Embodiment 1 to the main assembly of the image forming apparatus.
Figure 25:
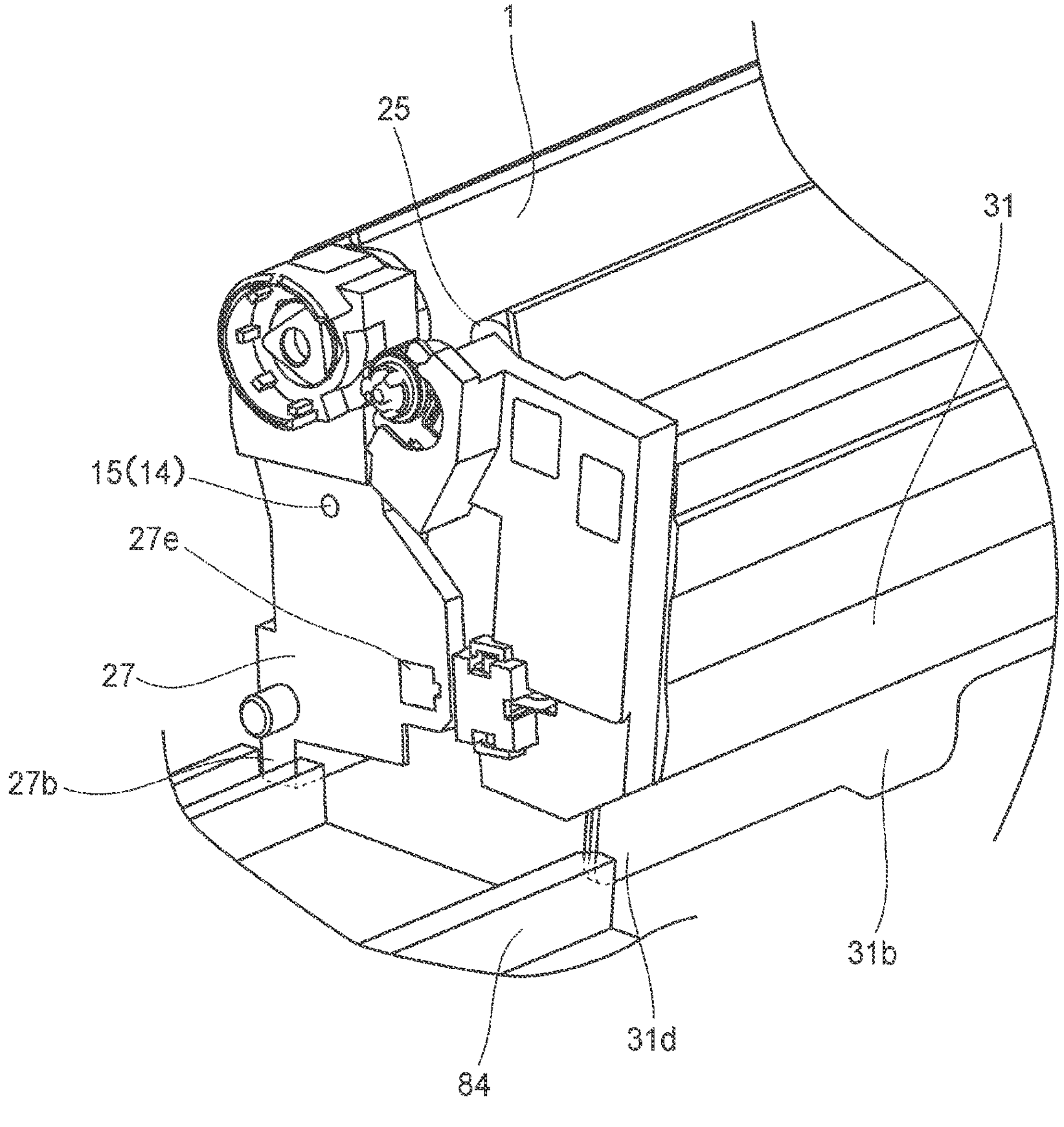
FIG. 25 is a perspective view when carrying out remounting of the process cartridge in Embodiment 1 to the main assembly of the image forming apparatus.
Figure 27:
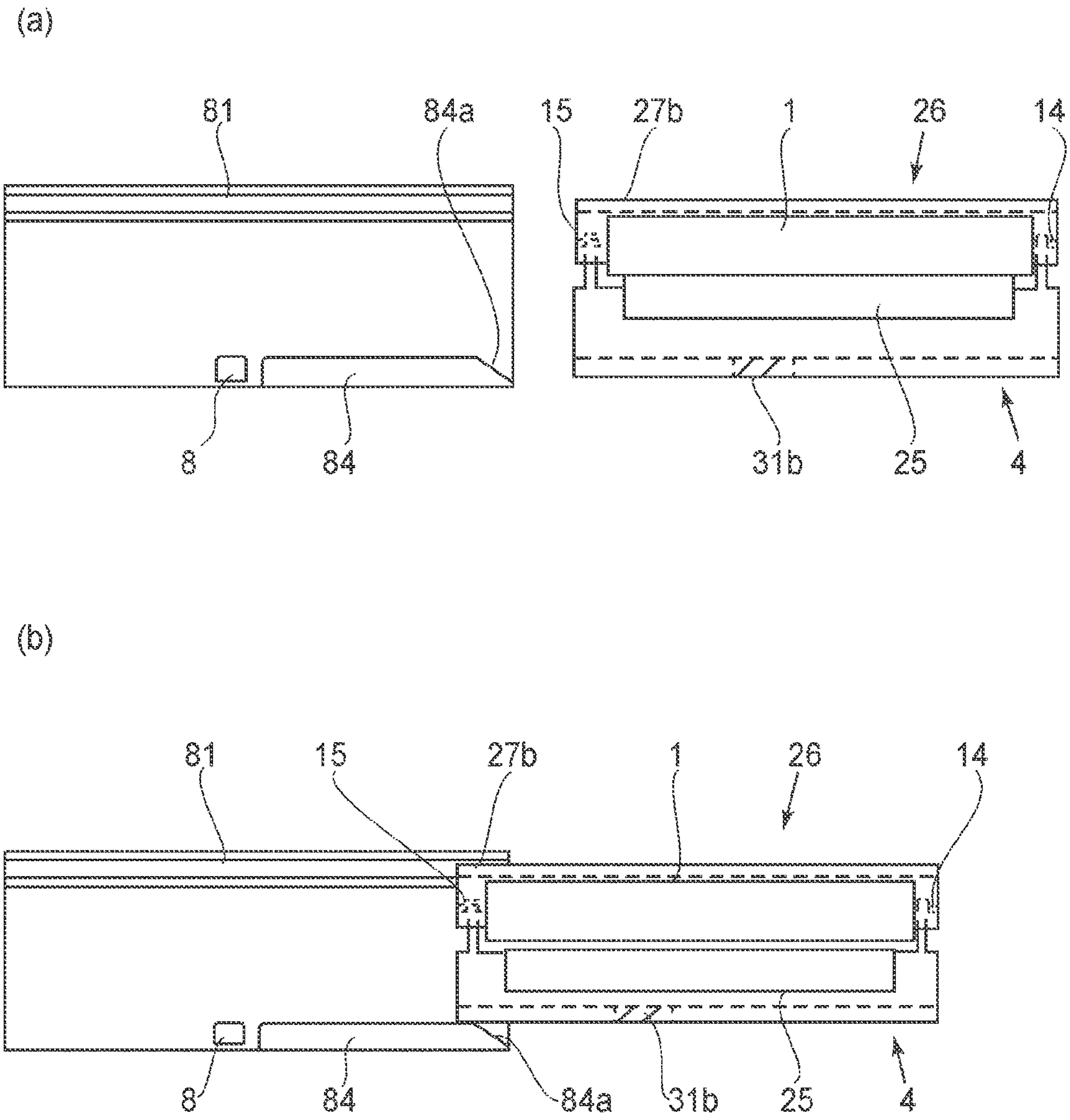
FIG. 27 is a schematic illustration which illustrates a mounting operation for the process cartridge in Embodiment 1 to the main assembly of the image forming apparatus.

Referring to FIG. 24-FIG. 27, the structure for this purpose will be described. As shown in FIG. 24, FIG. 25 and FIG. 27, the main assembly 100A of the apparatus 100 is provided with a mounting opening 87 for permitting mounting the process cartridge 7. Furthermore, the main assembly 100A of the apparatus 100 is provided with spacing guide portion 84 for contacting spacing force receiving portion 31*b* provided in the developing unit 4 of the process cartridge 7.

As shown in FIG. 26(*a*) and FIG. 27(*a*), before moving the process cartridge 7 into the main assembly 100A of the apparatus 100, the developing unit 4 is in the contact position, and therefore, the photosensitive drum 1 and the developing roller 25 contact to each other. As shown in FIG. 26(*b*), when the process cartridge 7 is mounted to the main assembly 100A of the apparatus 100, the guide portion 27*b*, integral with the cleaning frame 27, is first mounted to the main assembly guide member 81 provided in the main assembly 100A of the apparatus 100. And, the spacing force receiving portion 31*b* provided in the developing device frame 31 contacts inclined bevelled portion 84*a* of spacing guide portion 84. As shown in FIG. 26(*c*) and FIG. 27(*b*), when the process cartridge 7 further enters the main assembly 100A, the developing unit 4 rotates in the direction of arrow J around the axis of the back supporting pin 15. By doing so, the developing unit 4 moves to the spaced position of arrow K, so that the developing roller 25 is spaced from the photosensitive drum 1. As shown in FIG. 10, when the process cartridge 7 has been positioned by the image forming apparatus main assembly 100A, the spacing force receiving portion 31*b* is contacted to the spacer member 8 disposed downstream with respect to the mounting direction of the spacing guide portion 84. The developing unit 4 is in the spaced position in that case, and therefore the process cartridge 7 can be mounted to the image forming apparatus main assembly 100A, with the spaced state maintained from the photosensitive drum 1. In this case, a clearance 31*e* provided upstream of the force receiving portion 31*b* relating to the mounting direction of the process cartridge 7 has a configuration that does not interfere with the mounting guide portion 84. By doing so, the developing unit 4 can move to the contact position, without interfering with the spacing guide portion 84.

(Structures of Developing Roller Supporting Portion and Developing Drive Force Input Portion in Process Cartridge)

Figure 12:
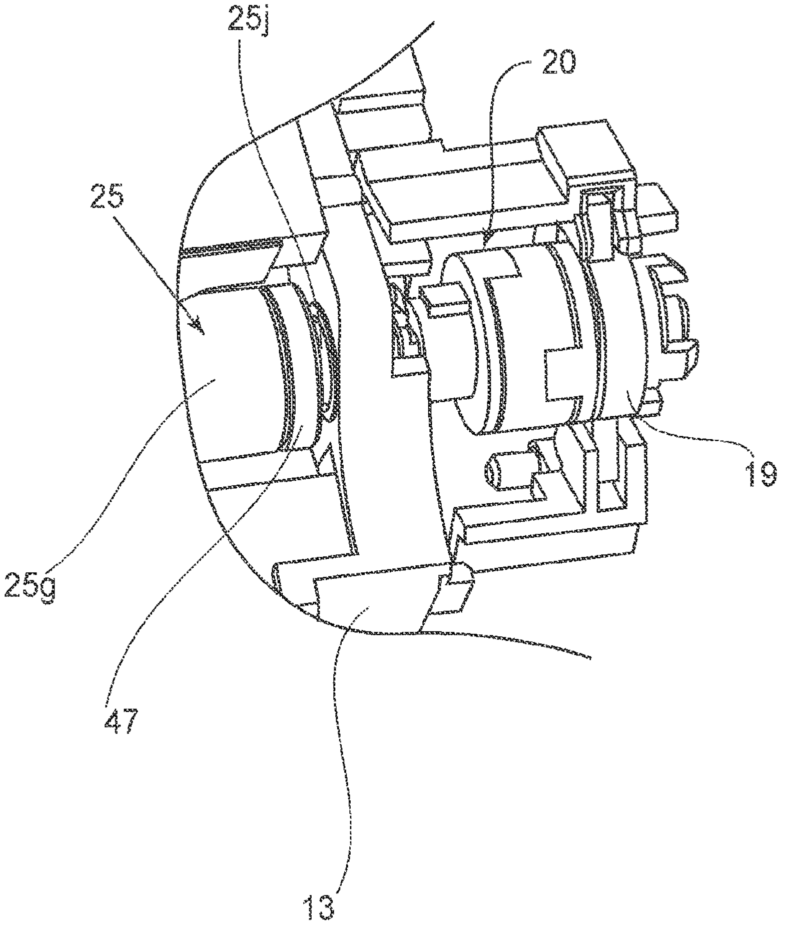
FIG. 12 illustrates a supporting structure of a developing roller in Embodiment 1.

Referring to FIG. 12-FIG. 16, a description will be provided about the supporting structure for the structure of the developing drive force input portion, and the developing roller 25 in the process cartridge 7 of this embodiment. FIG. 12 illustrates one longitudinal end side (rear side) of the supporting portion of the developing roller 25. In FIG. 12, the developing roller shaft 25*j* of the developing roller 25 is rotatably engaged with the inner surface of the developing-device-rear bearing 13. Between the rubber roller portion 25*g* of the developing roller 25 and the developing-device-rear bearing 13, a regulation roller 47, for regulating the degree of contact, to the photosensitive drum 1, of the developing roller 25, engages the developing roller shaft 25*j* rotatably. Heretofore, the supporting structure by the side of the one longitudinal end of the developing roller 25 is described, but the bearing portion is similarly provided to the bearing member integrally at the other end side in the longitudinal direction to support the other end side of the developing roller shaft 25*j* rotatably.

Figure 13:
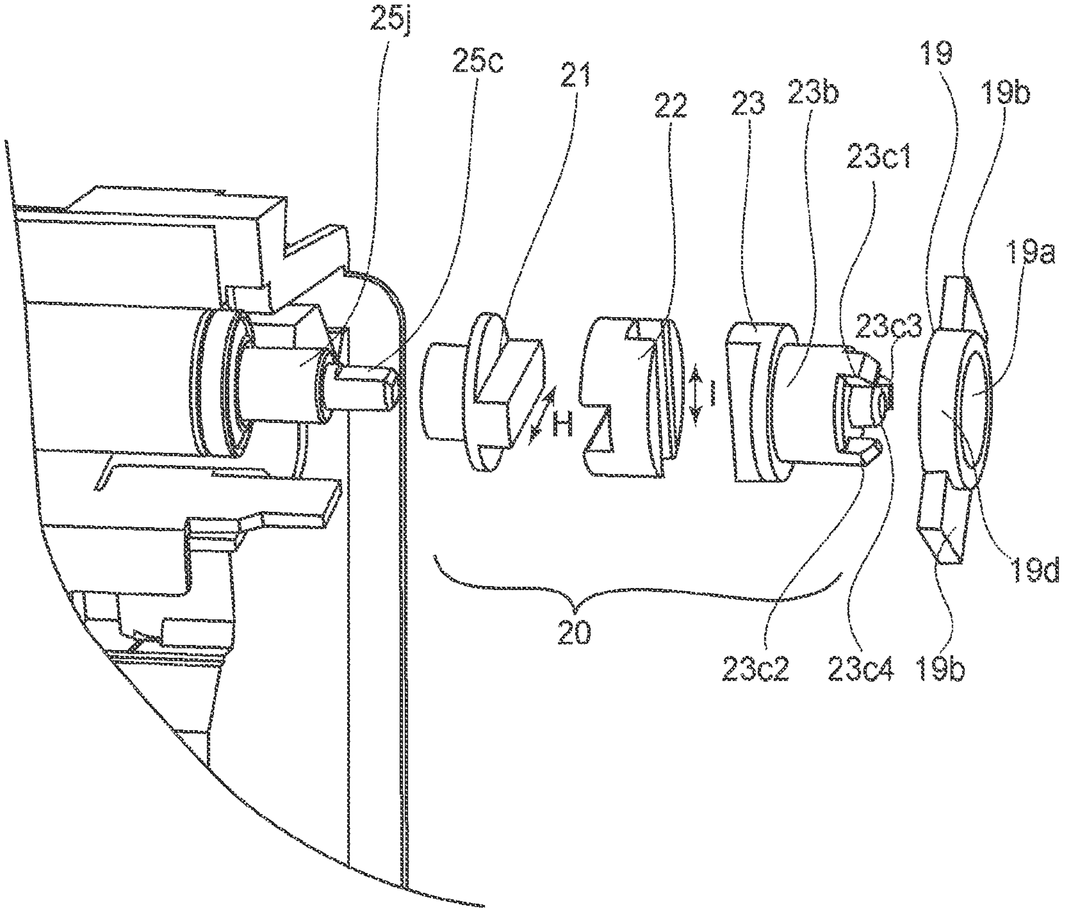
FIG. 13 is an exploded view of a shaft coupling member in Embodiment 1.
Figure 14:
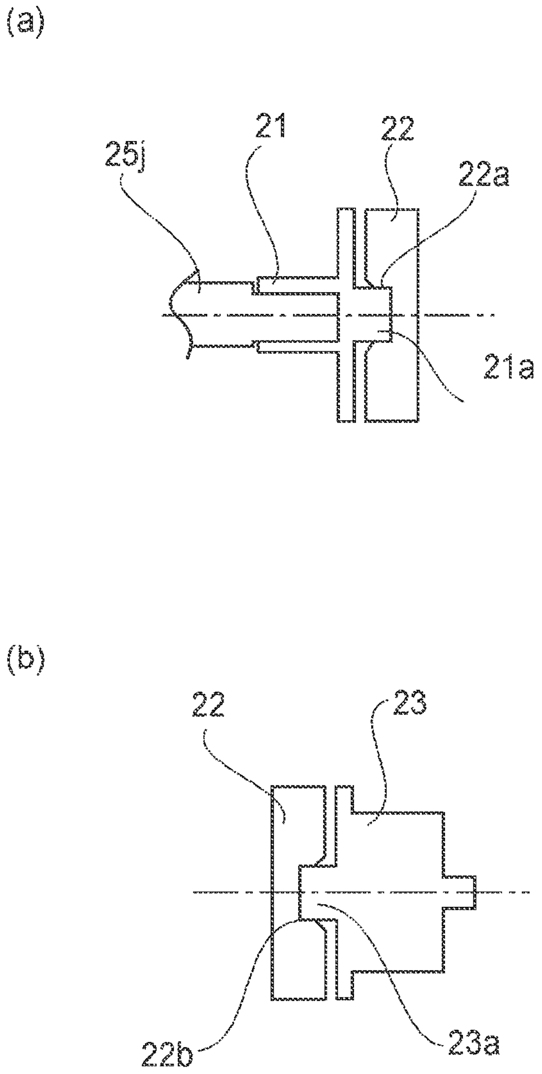
FIG. 14 is a cross-sectional illustration of a shaft coupling member in Embodiment 1.

In this embodiment, an Oldham coupling 20, which is a shaft coupling member, is used as the developing drive force input portion. Referring to FIG. 13 and FIG. 14, the structure of the Oldham coupling 20 will be described. For easy understanding of the Oldham coupling 20, the developing-device-rear bearing 13 is omitted, here.

As shown in FIG. 13, the Oldham coupling 20 comprises a driven side engaging portion 21, an intermediary engaging portion 22, and a driving side engaging portion 23.

The driven side engaging portion 21 is fixed to the end of the developing roller shaft 25*j*. As for the fixing method, a spring pin and a parallel pin can be used. In addition, as shown in FIG. 13, in an alternative structure, the cut portion 25*c* is provided on a peripheral surface of the developing roller shaft 25*j*, and a hole provided in the driven side engaging portion 21 is provided with the complementary configuration. A shaft portion 23*b* of the driving side engaging portion 23 is rotatably retained in the hole 19*a* of an engaging portion bearing member 19. The driving side engaging portion 23 is provided integrally with the projections 23*c*1 to 23*c*4 engageable with a main assembly development coupling 53 (FIG. 16) which is a second main assembly drive transmission member of the main assembly 100A of the apparatus 100, as will be described hereinafter. This Oldham coupling 20 transmits the rotational driving force (second rotational driving force) from the main assembly 100A of the apparatus 100 to the developing roller 25, permitting the deviation between the axis of the main assembly development coupling 53 and the axis of the developing roller 25.

Referring to sectional view of FIG. 14, the Oldham coupling 20 will be described in more detail. FIG. 14(*a*) is the sectional view taken along the surface perpendicular to the direction of arrow H of FIG. 13, and FIG. 14(*b*) is the sectional view taken along the surface perpendicular to the direction of arrow I in FIG. 13.

The driven side engaging portion 21 is provided integrally with a rib 21*a* as shown in FIG. 14(*a*). A groove 22*a* is formed on the intermediary engaging portion 22, and the rib 21*a* and the groove 22*a* are engaged with each other in FIG. 13 for movement in the direction of arrow H.

The driving side engaging portion 23 is provided integrally with a rib 23*a* as shown in FIG. 14(*b*). A groove 22*b* is formed in the intermediary engaging portion 22, and the rib 23*a* and the groove 22*b* are engaged with each other for the movement in the direction of arrow I in FIG. 13.

Figure 15:
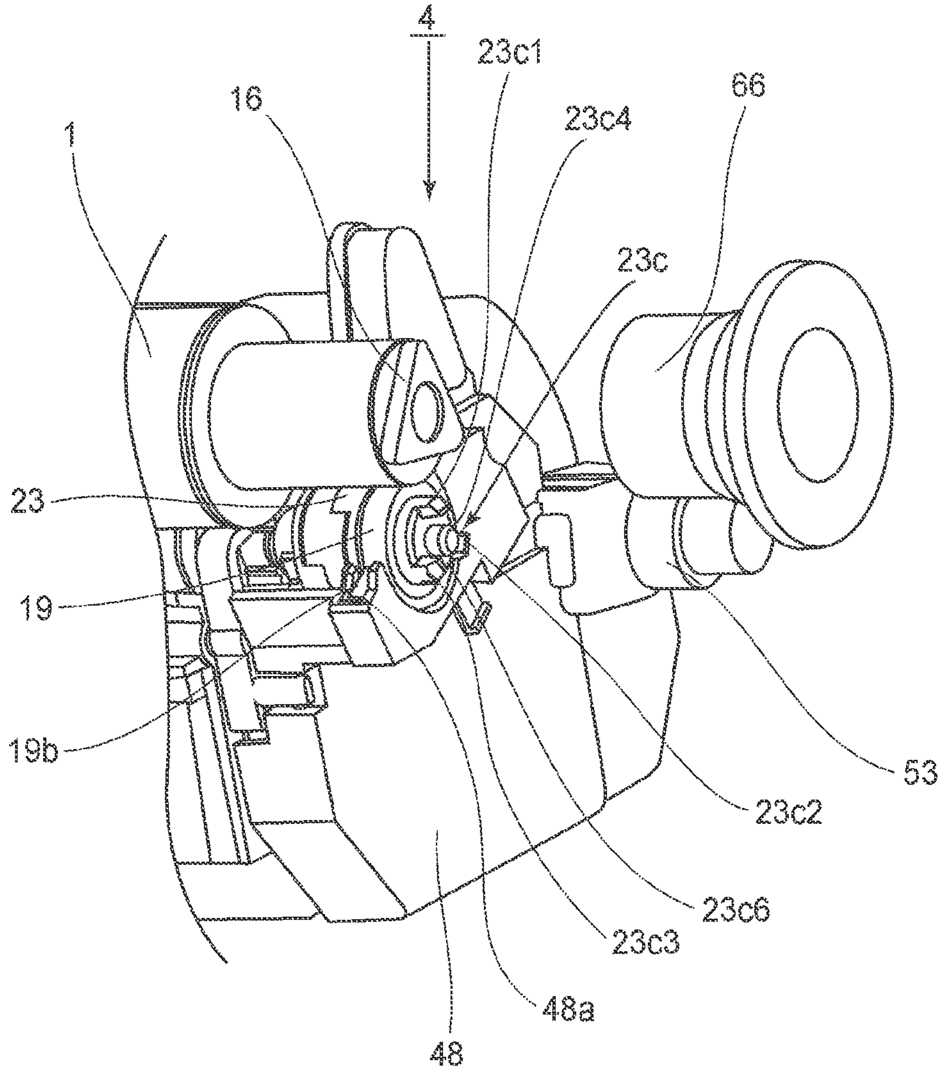
FIG. 15 is a perspective view of a shaft coupling member of the developing unit in Embodiment 1.

FIG. 15 illustrates the structure of the coupling provided in the process cartridge 7. The projections 23*c*1-23*c*3 projected in the axial direction are formed in the end surface of the driving side engaging portion 23 of the Oldham coupling 20 mounted to the developing unit 4. A centering boss 23*c*4 for alignment (rotation axis) relative to the main assembly development coupling 53 projects in the direction of the axis from the end surface of the driving side engaging portion 23. The one end side in the axial direction of the photosensitive drum 1 is provided with a drum coupling 16 of a triangular prism configuration. A guide portion 19*b* of the engaging portion bearing member 19 is guided by the groove 48*a* of a side cover 48 fixed by an unshown screw and so on to the developing unit 4, for movement in the direction crossing the axial direction of the developing roller 25. In other words, the driving side engaging portion 23 is movable in the direction crossing the developing unit 4.

Figure 16:
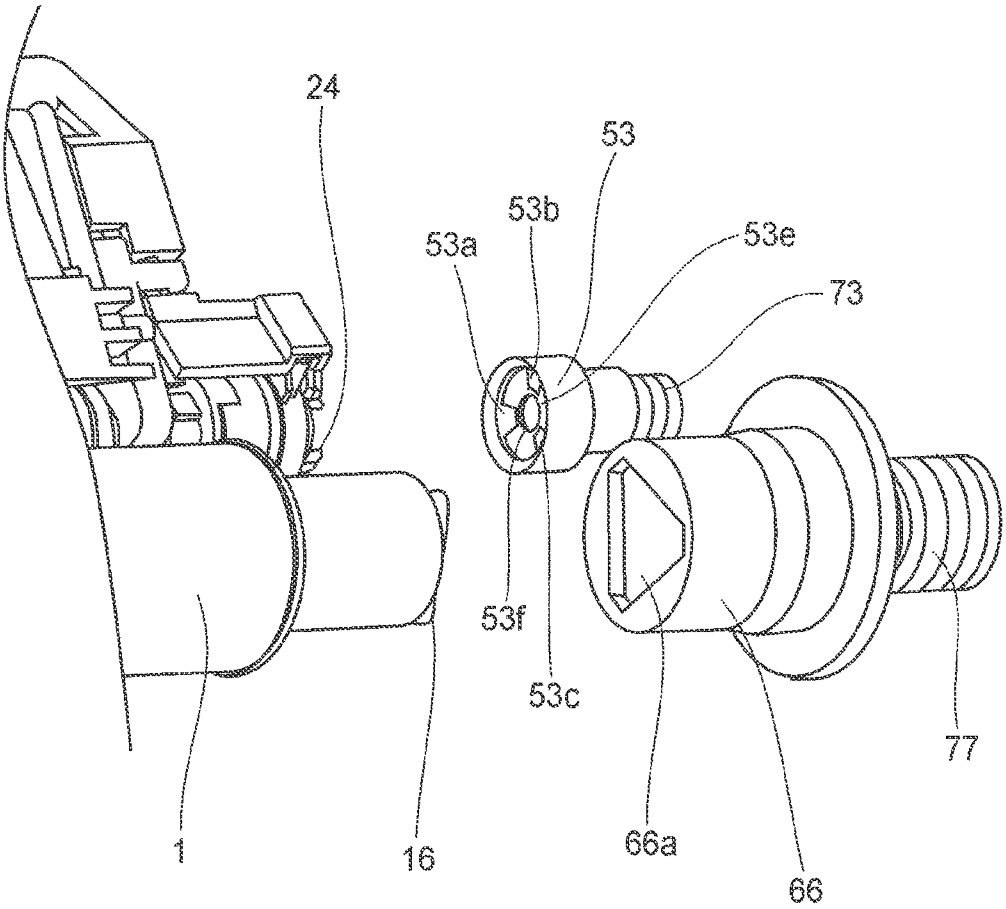
FIG. 16 is a perspective view which illustrates a first main assembly driving member and a second main assembly driving member of the image forming apparatus in Embodiment 1.

FIG. 16 illustrates the structure of the coupling provided in the main assembly 100A of the apparatus 100. As shown in FIG. 16, the drum drive coupling 66, which is the first main assembly drive transmission member for transmitting the driving force of the main assembly 100A of the apparatus 100 to the photosensitive drum 1, is provided with a hole 66*a* which has a section of a substantially triangular shape. The main assembly development coupling 53, which is the second main assembly drive transmission member for transmitting the rotational driving force (the second rotational driving force) to the developing roller 25 from the main assembly 100A of the apparatus 100, is provided with holes 53*a*-53*c*. The drum drive coupling 66 is urged by a pressing member 77, such as the compression spring, toward the process cartridge 7. The drum drive coupling 66 is movable in the axial direction of the photosensitive drum 1. When a phase deviation occurs between the drum coupling 16 and the hole 66*a* of the drum drive coupling 66 at the time of the mounting, to the main assembly 100A of the apparatus 100, of the process cartridge 7, the drum drive coupling 66 is pushed and retracted by the drum coupling 16. However, the drum coupling 16 and the hole 66*a* are brought into engagement with each other by the drum drive coupling 66 rotating, so that the rotational driving force is transmitted to the photosensitive drum 1.

The main assembly development coupling 53 is urged by a pressing member 73, such as a compression spring, toward the process cartridge 7 in the direction parallel with the axial direction of the photosensitive drum 1. However, the main assembly development coupling 53 is mounted to the main assembly 100A of the apparatus 100 without play with respect to the direction crossing the axial direction. In other words, the main assembly development coupling 53 is movable only in the axial direction except during the rotation for the drive transmission.

When the driving side engaging portion 23 and the main assembly development coupling 53 engage with each other by the entrance in the main assembly 100A of the apparatus 100 of the process cartridge 7, a phase deviation may occur between the projections 23*c*1 to 23*c*3 and the holes 53*a*-53*c*. In this case, the free ends of the projections 23*c*1 to 23*c*3 abut at the positions other than the holes 53*a*-53*c*, and the main assembly development coupling 53 retracts in the axial direction against the urging force of the pressing member 73. However, when the main assembly development coupling 53 rotates and the phases between projections 23*c*1-23*c*3 and the holes 53*a*-53*c* align with each other, the main assembly development coupling 53 is advanced by the urging force of the pressing member 73. The projections 23*c*1 to 23*c*3 and the holes 53*a*-53*c* are brought into the engagement with each other, so that the centering boss 23*c*4, which is the engaging portion positioning portion, and the centering hole 53*e*, which is transmission member positioning portion, are engaged with each other. The axis (rotation axis) of the driving side engaging portion 23 and the main assembly development coupling 53 are aligned. The projections 23*c*1 to 23*c*3 and the holes 53*a*-53*c* are engaged with each other by the main assembly development coupling 53 rotating, so that the rotational driving force is transmitted to the developing roller 25.

Here, the driving force to the drum drive coupling 66 and to the main assembly development coupling 53 is supplied from a motor provided in the main assembly 100A of the apparatus 100. One motor may be provided for each of the process cartridges, or commonly for a plurality of the process cartridges.

(Operation of Oldham Coupling at the Time of Development Separation—Contact Operation in Process Cartridge)

Referring to FIG. 17-FIG. 20, the operation of the Oldham coupling 20 at the time of the development separation-contact operation in the process cartridge of this embodiment will be described.

Figure 17:
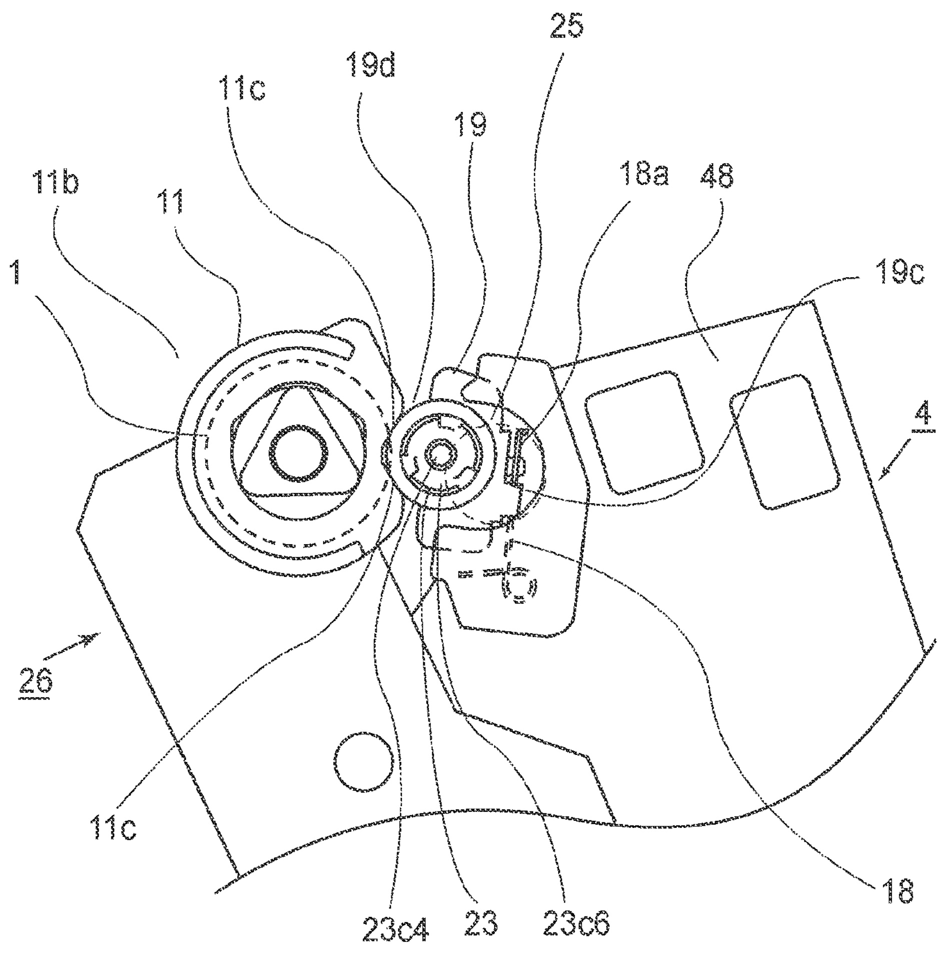
FIG. 17 is a side view which illustrates an operation of the shaft coupling member at the time of the separating operation of the developing unit in Embodiment 1.
Figure 18:
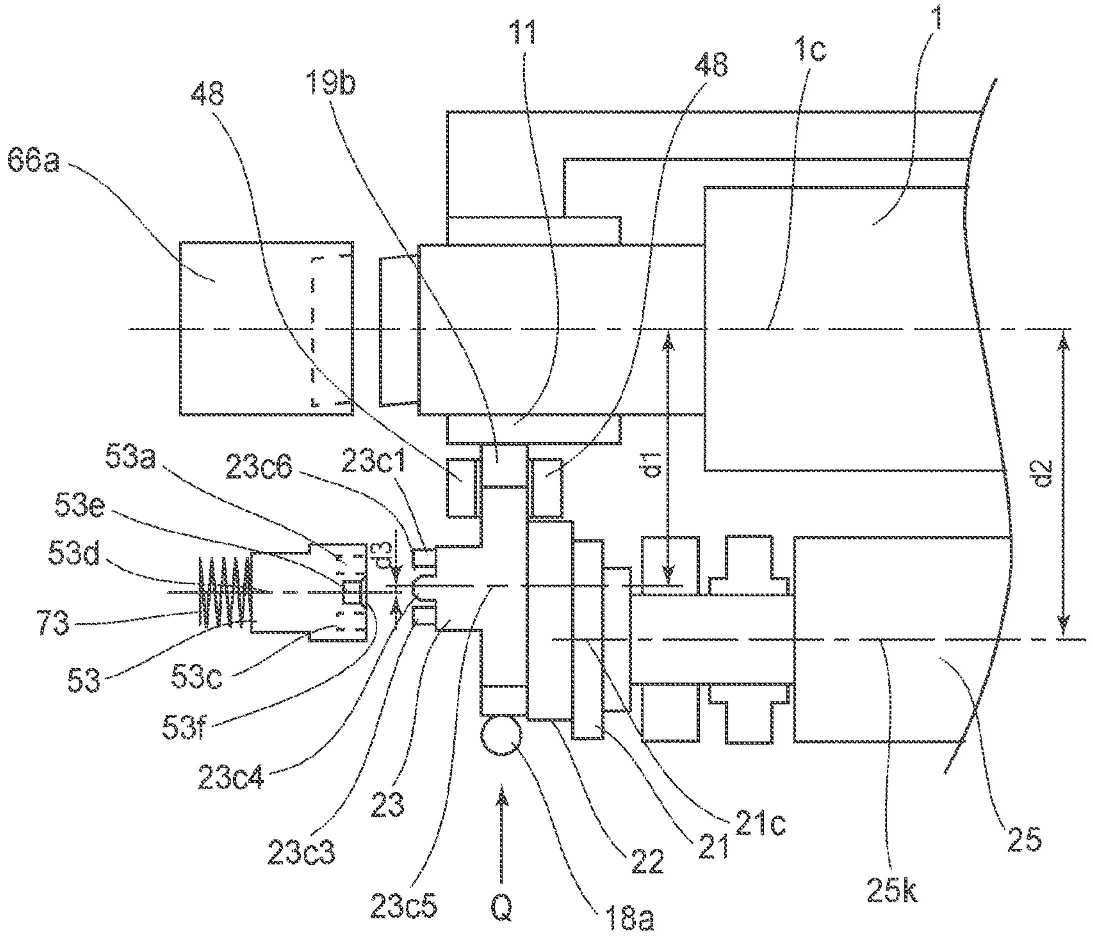
FIG. 18 is a schematic illustration which illustrates an operation of the shaft coupling member at the time of the separating operation of the developing unit in Embodiment 1.

FIG. 17 is the side view which illustrates the state where the developing unit 4 is positioned at the spaced position, and FIG. 18 is the longitudinal section which illustrates the state where the developing unit 4 positions at the spaced position.

As shown in FIG. 17, the developing roller 25 (broken lines) and the photosensitive drum 1 (broken lines) are in the state where they are spaced from each other, in the state where the developing unit 4 is positioned at the spaced position by the space holding member 64 or by the spacing guide portion 84. However, an arm portion 18*a* of the urging member 18, which is a torsion coil spring, provided on the side cover 48, contacts a locking portion 19*c* (FIG. 17) of the engaging portion bearing member 19. By doing so, the driving side engaging portion 23 is urged in the direction (the direction of arrow Q in FIG. 18) crossing with axial direction of the developing roller 25. The contact portion 19*d* of the engaging portion bearing member 19 is contacted to the contact portion 11*c*, which is the holding portion provided in the drum-rear bearing 11, so that the position of the engaging portion bearing member 19 is determined. More particularly, the driving side engaging portion 23 is positioned at the predetermined position. Here, the contact portion 11*c* of the drum-rear bearing 11 is formed by the two surfaces which are in parallel with the axis of the photosensitive drum 1 and which constitute the shape of a V configuration. The engaging portion bearing member 19 can be retained in parallel with the axis of the photosensitive drum 1 by contacting the engaging portion bearing member 19 to this contact portion 11*c*. In addition, the drum-rear bearing 11 is provided integrally with a positioning portion 11*b*. For this reason, the driving side engaging portion 23 rotatably supported by the engaging portion bearing member 19 is positioned with high precision relative to the rear side plate 83 of the main assembly 100A of the apparatus 100, which positions the positioning portion 11*b*. Therefore, it is positioned with high precision also relative to the axis 53*d* of the main assembly development coupling 53 provided in the main assembly 100A of the apparatus 100. The driving side engaging portion 23 of the Oldham coupling 20 is rotatably engaged with the engaging portion bearing member 19. For this reason, in this state, the axis 23*c*5 of the driving side engaging portion 23 of the Oldham coupling 20 is shifted (deviated) from the axis 25*k* of the developing roller 25. And, the axis 23*c*5 of the driving side engaging portion 23 is nearer than the axis 25*k* of the developing roller 25 to the axis 53*d* of the main assembly development coupling 53 of the main assembly 100A of the apparatus 100. In other words, the position n by which the driving side engaging portion 23 is positioned is such a position that when the process cartridge 7 enters into the main assembly 100A of the apparatus 100, it engages smoothly with the main assembly development coupling 53. Although the means for urging the engaging portion bearing member 19 in this example is the urging member 18, the engaging portion bearing member 19 may be provided integrally with the elastic portion which is elastically deformable, so that the engaging portion bearing member 19 is contacted to the contact portion 11*c*.

Referring to FIG. 18, a still more detailed description will be provided. When the main assembly development coupling 53 engages and rotates in the driving side engaging portion 23, the driving side engaging portion 23 is correctly positioned by the main assembly development coupling 53 as will be described hereinafter. By doing so, the contact portion 19*b* of the engaging portion bearing member 19 is spaced from the drum-rear bearing 11 and its contact portion 11*c*. For this reason, when the process cartridge 7 enters the main assembly 100A of the apparatus 100, the axis 23*c*5 of the driving side engaging portion 23 begins the engagement in the state where it is shifted from axis 53*d* of the main assembly development coupling 53 by the distance d3 toward the photosensitive drum 1 side. By the process cartridge 7 further entering from this state, the bevelled portion 23*c*6 (FIG. 15) provided in the centering boss 23*c*4 and 53*f* (FIG. 16) of bevelled portions provided in the hole 53*e* contact each other, so that they engage, correcting the deviation between axes.

FIG. 18 illustrates the state where the developing unit 4 is positioned at the spaced position. In this state, as has been described hereinbefore, the axis 23*c*5 of the driving side engaging portion 23 and the axis 25*k* of the developing roller 25 deviate from each other. More particularly, the distance d1 between the axis (rotation axis) 1*c* of the photosensitive drum 1 and the axis 23*c*5 of the driving side engaging portion is smaller than the distance d2 between the axis 1*c* of the photosensitive drum 1, and the axis 25*k* of the developing roller 25. In other words, the driving side engaging portion 23 is closer to the photosensitive drum 1 than the developing roller 25.

Even if the developing unit 4 is in the state of positioning at the developing position, the intermediary engaging portion 22 is in engagement with both the driving side engaging portion 23 and the driven side engaging portion 21. For this reason, even when the developing unit 4 moves between the spaced position and the contact positions, the intermediary engaging portion 22 permits those movements, maintaining the engagement with the driving side engaging portion 23 and with the driven side engaging portion 21.

At this time the driving side engaging portion 23 is positioned with high precision relative to the main assembly development coupling 53 by the contact portion 11*c*, and therefore, there is no need to substantially upsize the bevelled portion 23*c*6 and the bevelled portion 53*f*, so that the driving side engaging portion 23 and the main assembly development coupling 53 can be downsized.

Figure 28:
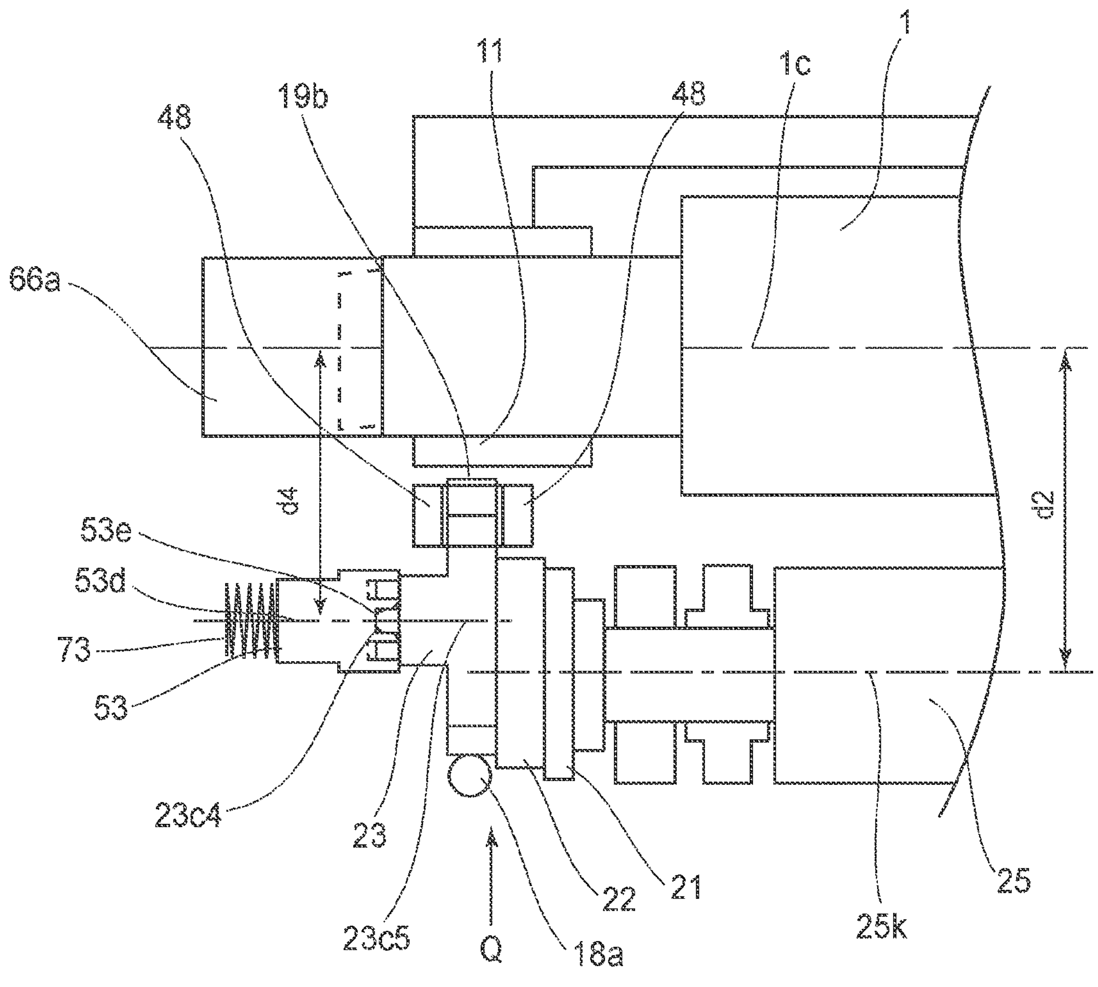
FIG. 28 is a schematic illustration which illustrates an operation of a shaft coupling member at the time of the separating operation of the developing unit in Embodiment 1.

As shown in FIG. 28, by the rotation of the main assembly development coupling 53, when the phases of the projections 23*c*1 to 23*c*3 of the driving side engaging portion 23 and the holes 53*a*-53*c* of the main assembly development coupling 53 align with each other, the boss 23*c*4 and the hole 53*e* are brought into engagement. This aligns the axis 23*c* of the driving side engaging portion 23, and the axis 53*d* of the main assembly development coupling 53 with each other. And, the driving side engaging portion 23 is positioned by the main assembly development coupling 53, and therefore, the engaging portion bearing member 19 is spaced from the drum-rear bearing 11. Here, the distance between the axis 1*c* of the photosensitive drum 1 and the driving side engaging portion 23*c*5 is further by d3 from the photosensitive drum 1 than d1 shown in FIG. 18 (distance d4). However, the driving side engaging portion 23 is in the position nearer to the photosensitive drum 1 than the developing roller 25.

Figure 19:
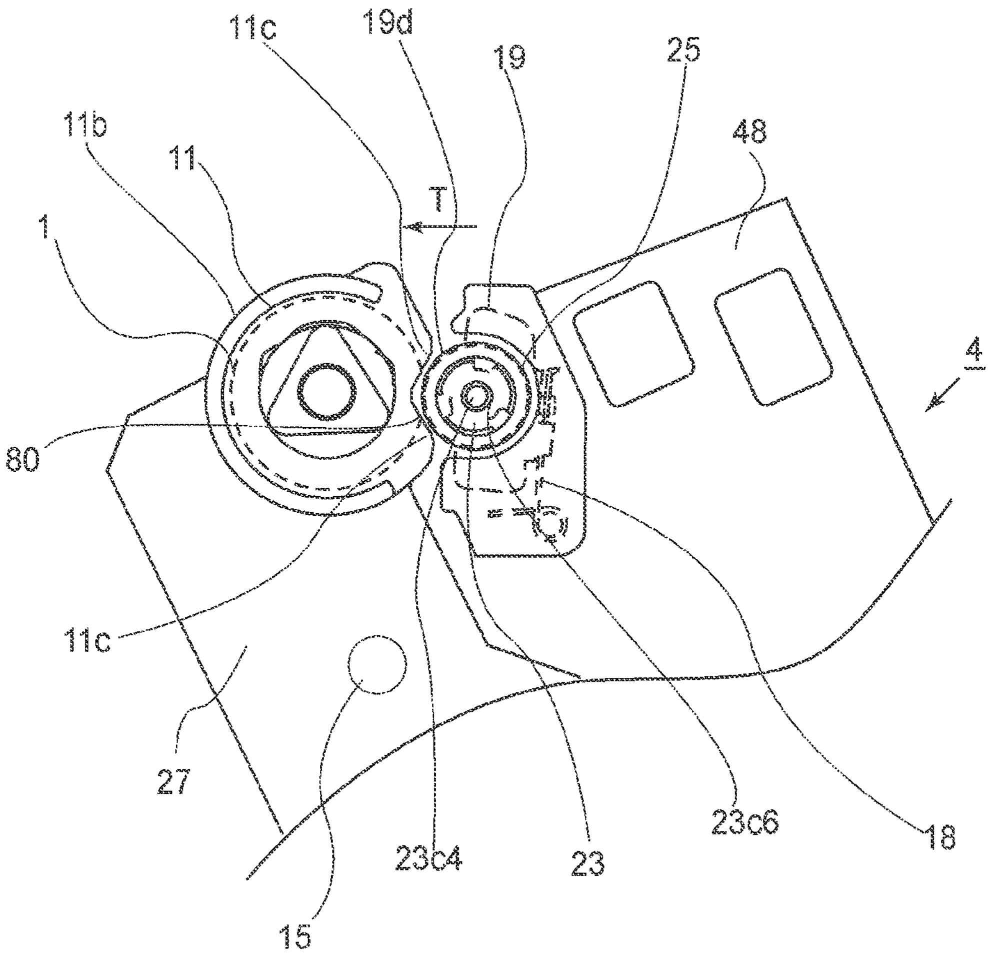
FIG. 19 is a side view which illustrates an operation of the shaft coupling member at the time of a contacting operation of the developing unit in Embodiment 1.
Figure 20:
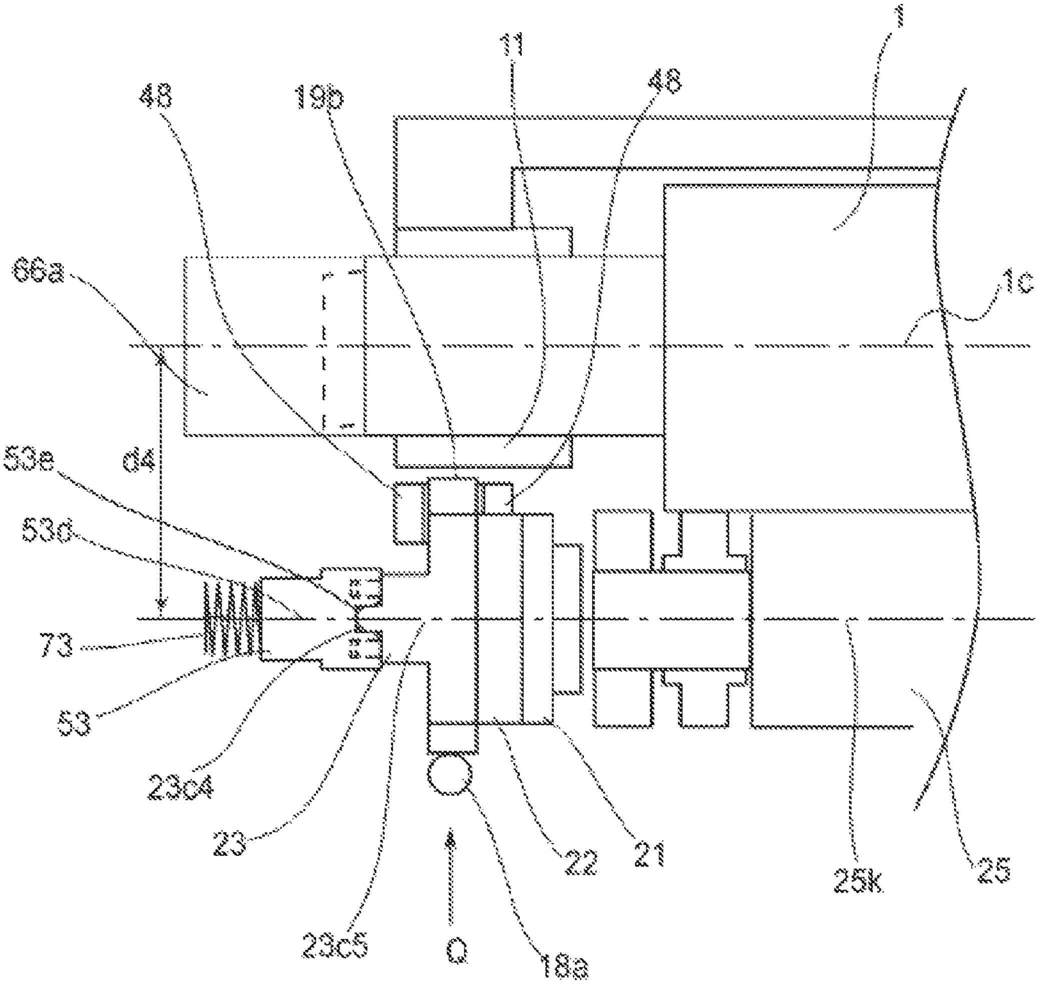
FIG. 20 is a schematic illustration which illustrates an operation of the shaft coupling member at the time of a contacting operation of the developing unit in Embodiment 1.

FIG. 19 and FIG. 20 illustrate the state where the developing unit 4 is in the contact position. The developing unit 4 of the process cartridge 7 rotates in the direction of arrow T by the operation of the spacer member 8 of the main assembly 100A of the apparatus 100 around the axis of the rear supporting pin 15, which supports the developing-device-rear bearing 13 of the cleaning frame 27. As shown in FIG. 20, then, the developing unit 4 moves to the contact position and the photosensitive drum 1 and the developing roller 25 abut to each other. Here, the driving side engaging portion 23 and the main assembly development coupling 53 are engaged with each other. Even if the developing unit 4 therefore, rotates in the direction of arrow T, the driving side engaging portion 23 of the Oldham coupling 20 maintains the engagement with the main assembly development coupling 53 of the main assembly 100A of the apparatus 100, and does not rotate it in the direction of an arrow T. As shown in FIG. 20, in the state where the engaging portion bearing member 19 is spaced from the drum-rear bearing 11 and there is a gap between the engaging portion bearing member 19 and the drum-rear bearing 11, the driving side engaging portion 23 and the main assembly development coupling 53 are engaged with each other. The axis 25*k* of the developing roller, the axis 23*c*5 of the driving side engaging portion 23, and the axis 53*d* of development couplings are substantially in alignment with each other. The distances from the respective drum axis 1*c* become d4.

As has been described hereinbefore, in this embodiment, the structure is such that the rotational driving force is directly inputted to the developing roller 25 through the coupling 22 from the main assembly development coupling 53 rotated independently of drum drive coupling 66, which inputs the rotational driving force to the photosensitive drum 1. Accordingly, the influence of the rotation of the developing roller 25 on the rotational accuracy of the photosensitive drum 1 can be suppressed, and furthermore, the rotational accuracy of the developing roller 25 per se is improved. For this reason, the image quality is improved.

In addition, the driving side engaging portion 23 of the Oldham coupling 20 is positioned at the constant position relative to the cartridge 7, and it is made movable in the direction crossing the axis 25*k* of the developing roller 25. By this arrangement, the main assembly development coupling 53 and the driving side engaging portion 23 can be engaged with each other without using the large guide and so on (space-saving). Therefore, the process cartridge 7 and the image forming apparatus 100 can be downsized. In addition, the operability of the mounting of the process cartridge 7 to the main assembly 100A of the apparatus 100 improves.

In addition, also when the developing roller 25 is mounted to the apparatus main assembly in the state spaced from the photosensitive drum 1, the driving side engaging portion 23 is placed at the constant position, and therefore the operability of the mounting, to the main assembly 100A of the apparatus 100, of the process cartridge 7 can be improved.

Furthermore, with respect to the output of the image, the Oldham coupling 20 is used, and therefore, the rotational driving force can be given to the developing roller 25 also where the developing unit 4 is spaced from the drum unit 26 so as to space the developing roller 25 from the photosensitive drum 1. Before the developing roller 25 for this reason, abuts the photosensitive drum 1, it is possible that the developing roller 25 is rotated so that the toner is triboelectrically charged by the developing blade 35, thereby giving a charge amount to the toner. When a sufficient charge amount cannot be given, and the toner is transferred onto the secondary transfer roller 70 (FIG. 1) through the intermediary transfer unit 5 from the photosensitive drum 1, the back side of the recording material (for example, paper) is contaminated. But, this problem can be prevented by the applying of triboelectrical charge before abutment of the developing roller 25 to the photosensitive drum 1.

In addition, there is a possibility that the residual toner container 71*a* of the intermediary transfer member cleaning 71 provided in the intermediary transfer unit 5 is filled up earlier rather than the expected lifetime of the cartridge 7 (increase of the exchange frequency of the residual toner container), but this possibility is also avoidable.

Furthermore, by using the Oldham coupling 20, also when the developing unit 4 is moved to the contact position from the spaced position, the developing roller 25 can be rotated. Therefore, when the developing unit 4 is moved to the contact position from the spaced position in the state where the photosensitive drum 1 rotates, the developing roller 25 can be rotated to reduce the impact to the photosensitive drum 1.

In addition, although this embodiment has been described with the example which uses the Oldham coupling 20, other couplings (for example, a lateral coupling and so on) which can absorb the rotational variation produced when the axes the input side and the output side are deviated, may be used.

Embodiment 2

Figure 21:
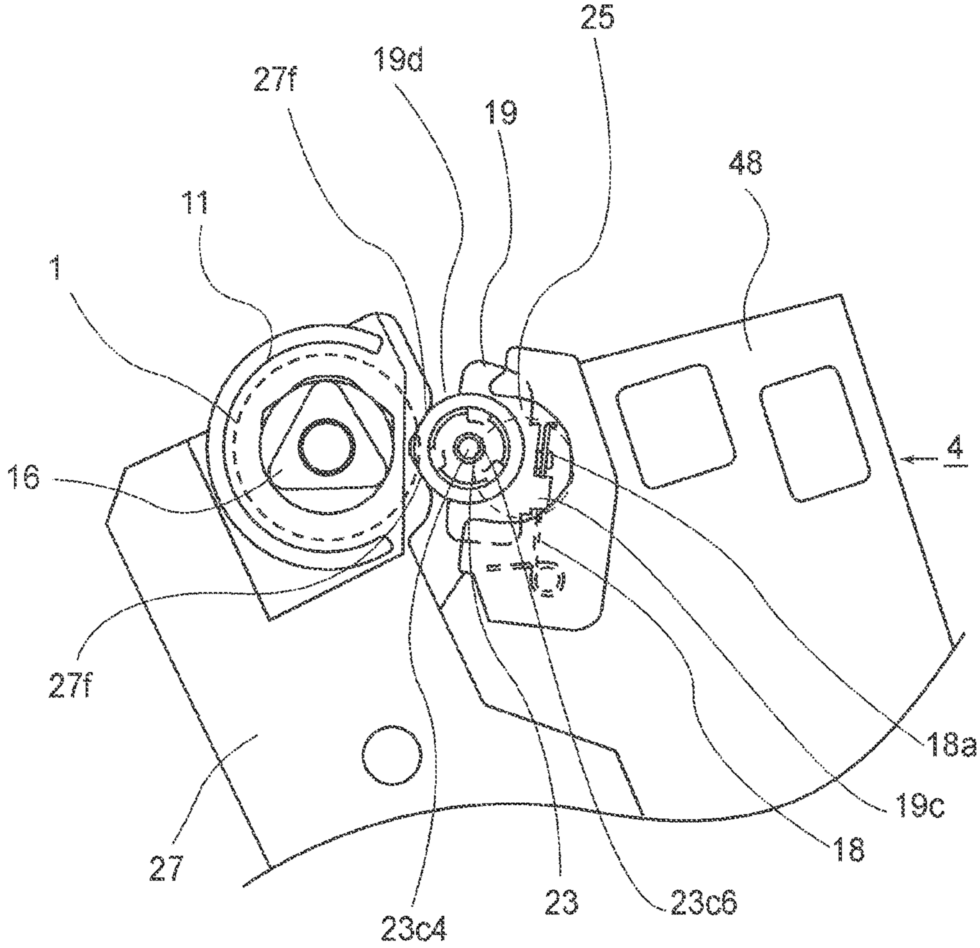
FIG. 21 is a side view which illustrates positioning of the shaft coupling member in Embodiment 2 of the present invention.

In the first embodiment, the engaging portion bearing member 19 is urged to the drum-rear bearing 10 which supports the photosensitive drum 1. As shown in FIG. 21, however, a contact portion 27*f*, which is the holding portion which can be contacted by the engaging portion bearing member 19, may be provided in the cleaning frame 27.

FIG. 21 illustrates the state where the developing unit 4 is positioned at the spaced position. As has been described with Embodiment 1, the developing unit 4 is in the spaced position by the developing device separation member 64 or the spacing guide portion 84, and therefore, as the broken lines show, the developing roller 25 and the photosensitive drum 1 are spaced from each other. However, the arm portion 18*a* of the urging member 18, which is the torsion coil spring provided in the side cover 48, abuts the locking portion 19*c* of the engaging portion bearing member 19, and therefore, the driving side engaging portion 23 is urged in the direction crossing the direction of the axis of the developing roller 25. Therefore, the contact portion 19*d* of the engaging portion bearing member 19 is contacted to the contact portion 27*f* provided in the cleaning frame 27, by which the position of the engaging portion bearing member 19 is determined. The contact portion 27*f* of the cleaning frame 27 is formed by two surfaces which are in parallel with the axis of the photosensitive drum 1 and which constitutes the shape of V. The cleaning frame 27 is provided with a drum-rear bearing 11, and the drum-rear bearing 11 is provided integrally with a positioning portion 11*b*. Therefore, the driving side engaging portion 23 rotatably supported by the engaging portion bearing member 19 can also be positioned relative to the axis 53*d* of the main assembly development coupling 53 with high precision. The other structures are the same as those of the first embodiment, and the effects similar to the effects in the first embodiment are provided.

Embodiment 3

In the first embodiment, the Oldham coupling is used as the shaft coupling member. When the developing roller diameter is small, it is required for the amount of developing device separation to be large, and therefore, a spring, which is the elastic portion, may be used for the intermediary engaging portion 22 of the shaft coupling member 20, as shown in FIG. 22.

Figure 22:
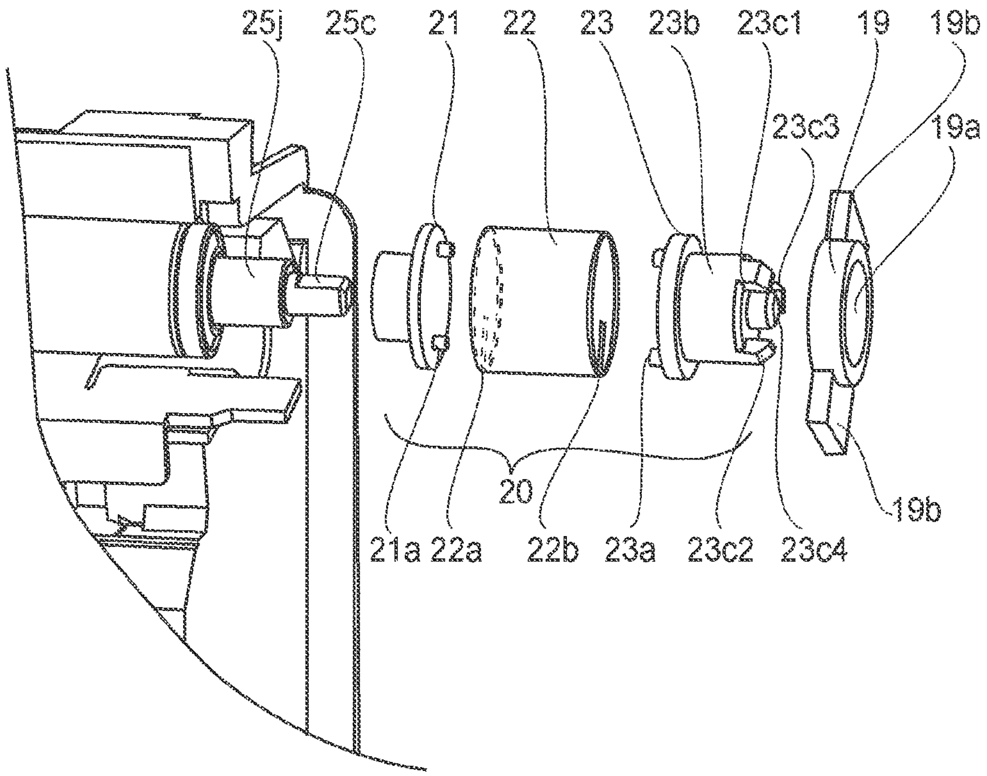
FIG. 22 is a perspective view which illustrates a shaft coupling portion in embodiment 3 of the present invention.
Figure 23:
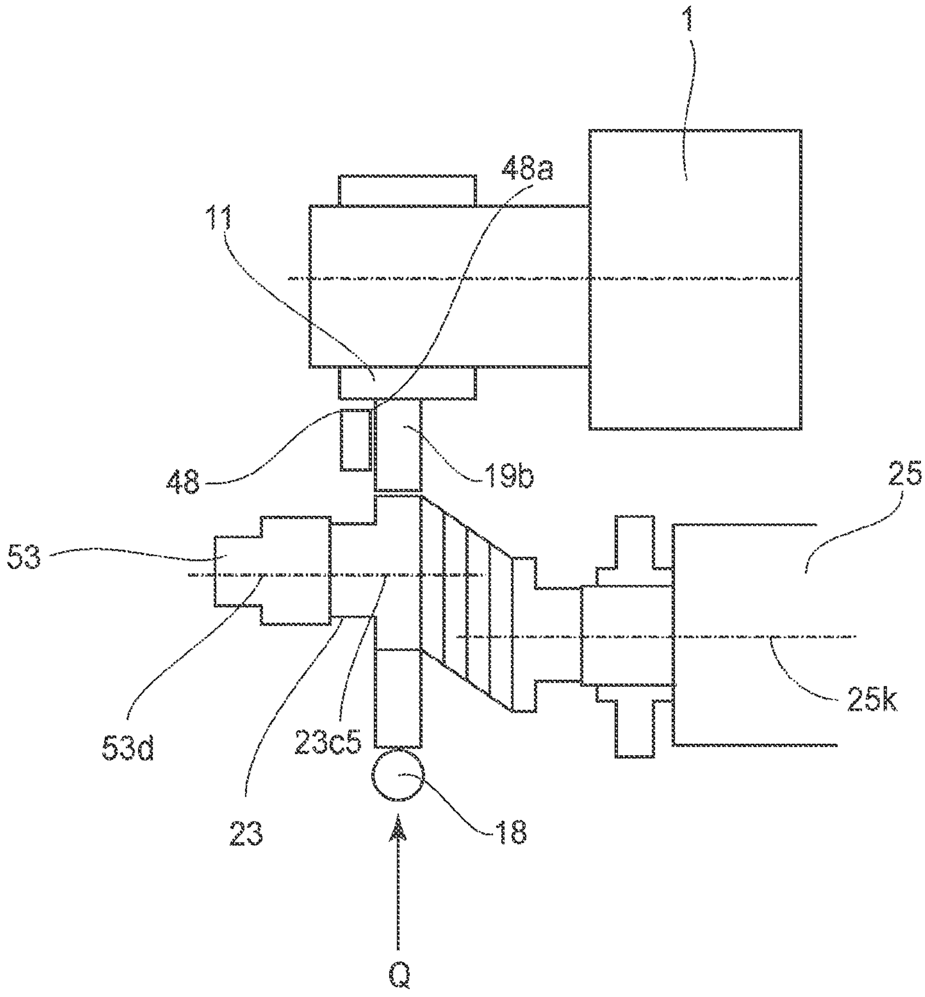
FIG. 23 is a schematic illustration which illustrates an operation of a shaft coupling member at the time of the separating operation of the developing unit in Embodiment 3.

In FIG. 22, the shaft coupling member 20 comprises a driven side engaging portion 21, an intermediary engaging portion or spring 22, and a driving side engaging portion 23. The intermediary engaging portion includes a spring 22. The driven side engaging portion 21 is provided with a boss 21*a* for the engagement of the spring 22. Similarly, the driving side engaging portion 23 is provided with a boss 23*a* which engages the spring 22. The spring 22 is provided with the arm portion 22*a* engaged with the driven side engaging portion boss 21*a*, and the arm portion 22*b* engaged with the driving side engaging portion boss 23*a*. The shaft portion 23*b* of the driving side engaging portion 23 is rotatably engaged with a hole 19*a* of the engaging portion bearing member 19. The projections 23*c*1 to 23*c*4 engaged with main assembly development coupling 53, which is the second main assembly drive transmission member of the main assembly 100A of the apparatus 100, as will be described hereinafter, is integrally formed on the driving side engaging portion 23. When the drive of the main assembly 100A of the apparatus 100 is transmitted to the driving side engaging portion 23, similarly to Embodiment 1, the drive will be transmitted to the arm portion 22*b* of the spring 22 from the development side coupling boss 23*a*. The rotational driving force transmitted to the spring 22 is transmitted in turn to the boss 21*a* of the follow-engaging portion 21 from the arm portion 22*a* of the spring 22. As shown in FIG. 23, when the outer diameter of the developing roller 25 is small, the shaft coupling member 20 of this embodiment is desirable than the Oldham coupling—as the case may be. This is because, the amount of deviation between the axis 23*c*5 of the driving side engaging portion 23 and the axis 25*k* of the developing roller 25 may be relatively large.

Figure 29:
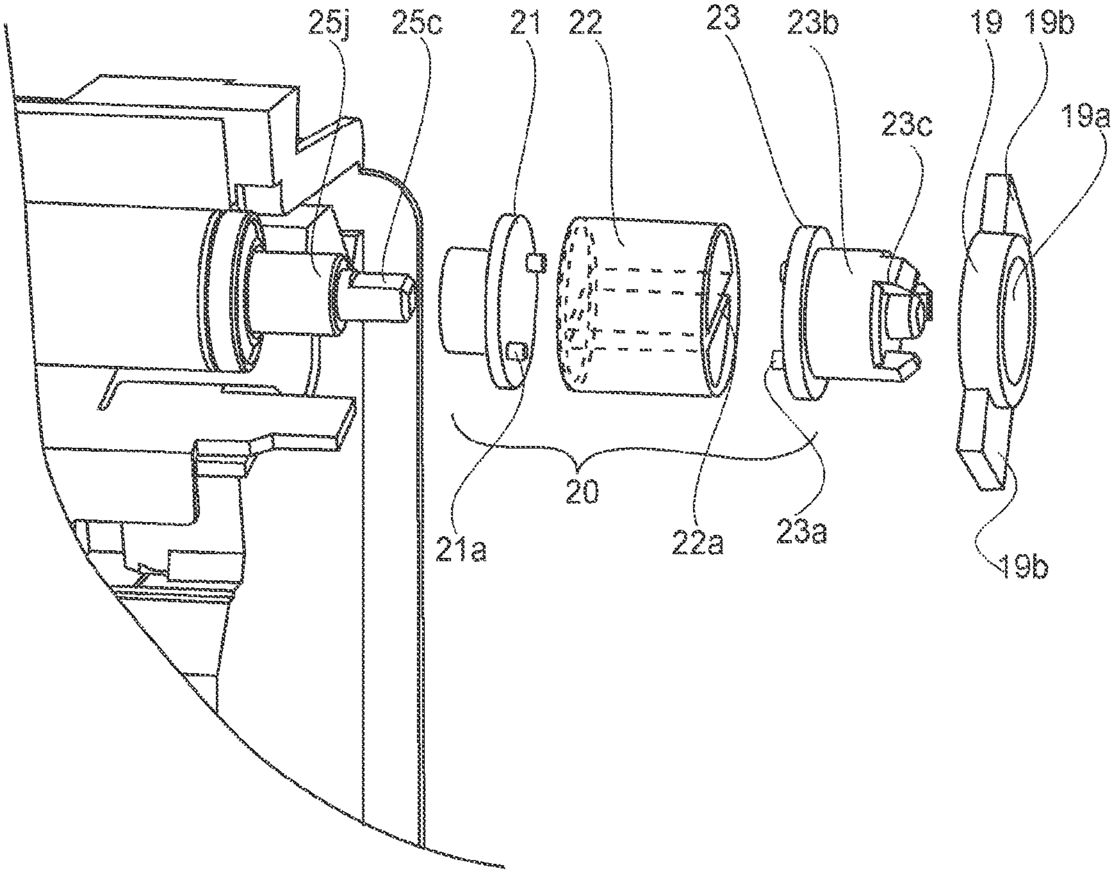
FIG. 29 is a perspective view which illustrates a shaft coupling member in the Embodiment 3 of the present invention.

Although the spring 22 is used as the middle engaging portion in this embodiment, an elastic rubber 22 of the cylindrical-shape may be used as the elastic portion as shown in FIG. 29. The inside circumference of the elastic rubber 22 is provided with a rib 22*a* for transmitting the driving force by the engagement with the boss 23*a* of the driving side engaging portion 23 and with the boss 21*a* of the driven side engaging portion 21.

The other structures are the same as those of the first embodiment, and the effects similar to the effects of the first embodiment are provided.

Embodiment 4

Figure 30:
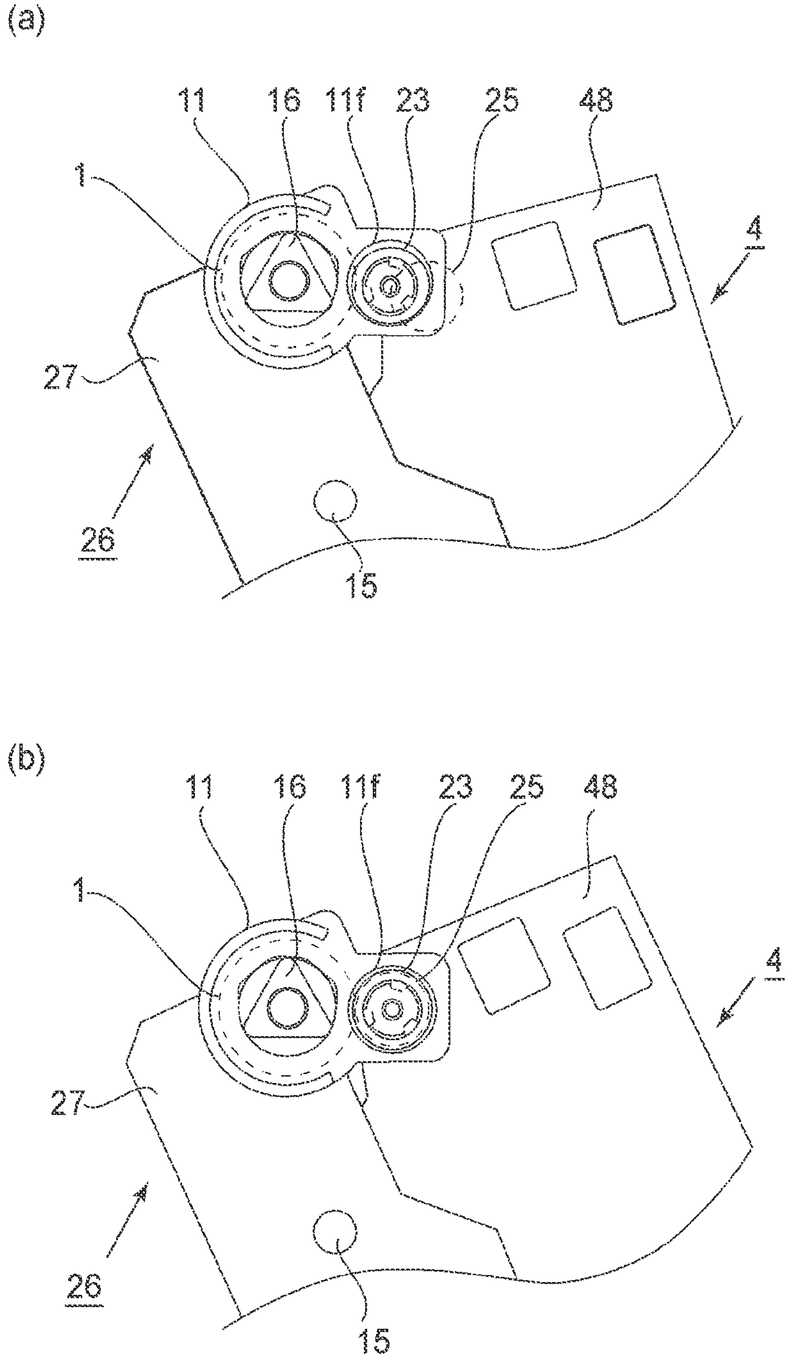
FIG. 30 is a side view which illustrates a holding structure of the shaft coupling member in Embodiment 4 of the present invention.

In the first embodiment, the engaging portion bearing member 19 is urged to the drum-rear bearing 10 which supports the photosensitive drum 1, by the urging spring 18. In this embodiment, the drum-rear bearing 11 is provided with a hole 11*f* which is the holding portion for retaining the driving side engaging portion 23, as shown in FIG. 30(*a*). An inner diameter of the hole 11*f* is large as compared with the outer diameter of the driving side engaging portion 23. More particularly, the driving side engaging portion 23 is retained for movement in the direction crossing the axis of the developing roller 25 to the hole 11*f*. In Embodiment 1, the driving side engaging portion 23 is positioned with a gap relative to the axis of 53*d* of the main assembly development coupling 53 with respect to the positioning direction to the drum-rear bearing 11, through the engaging portion bearing member 19, as shown in FIG. 18. In this embodiment, the structure is such that the axis 23*c*5 of the driving side engaging portion 23 may deviate in the direction crossing the axis of the developing roller 25 to whichever side. Even if the developing unit 4 moves to the spaced position from the contact position, the driving side engaging portion 23 is retained in the hole 11*f*. Therefore, also when the process cartridge 7 enters the main assembly 100A of the apparatus 100 with the state of being positioned at the spaced position, the driving side engaging portion 23 is smoothly engaged with the main assembly development coupling 53. FIG. 30(*b*) illustrates the state where the driving side engaging portion 23 is positioned by the main assembly development coupling (unshown). In more detail, the driving side engaging portion 23 is positioned by the main assembly development coupling (unshown), so that it does not contact the hole 11*f*.

Figure 31:
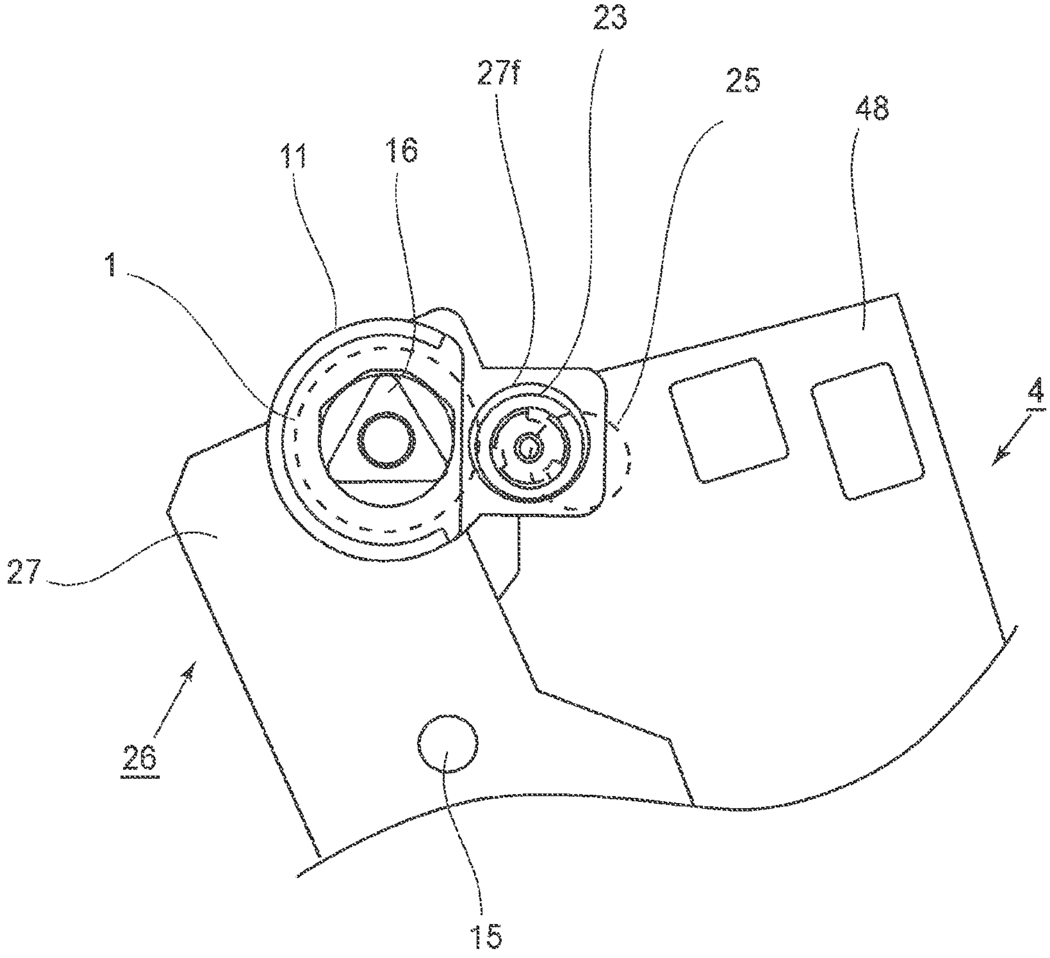
FIG. 31 is a side view which illustrates a holding structure of the shaft coupling member in the Embodiment 4 of the present invention.

As shown in FIG. 31, a hole 27*f* for retaining the driving side engaging portion 23 may be provided in the cleaning frame 27.

The other structures are the same as that of those of the first embodiment, and provide the effects similar to the effects of the first embodiment.

Other Examples

In the above described embodiment, although the four process cartridges are used, this number is not inevitable but may be selected suitably, if necessary, by one-skilled-in-the-art.

In the embodiments mentioned above, although the image forming apparatus is the type of printer, the present invention is not limited to this. For example, it is applicable also to other image forming apparatuses, such as the copying machine and the facsimile device, and the image forming apparatuses, such as a composite machine thereof. In addition, although the intermediary transfer member is used in the embodiment mentioned above, the color toner images are superimposedly transferred onto the intermediary transfer member sequentially and the toner images carried by the intermediary transfer member are transferred onto the transfer material all together, the present invention is not limited to this type. For example, in an alternative structure, the recording material carrying member is used and the color toner images are superimposedly transferred onto the recording material carried by the recording material carrying member sequentially. The similar effects are provided when the present invention is applied to these types of image forming apparatuses.

As has been described hereinbefore, according to the present invention the large guide for the engagement with the engaging portion and the second main assembly drive transmission member is unnecessary. For this reason, the process cartridge and the electrophotographic image forming apparatus are downsized. Furthermore, even if the process cartridge is mounted in the state where the photosensitive drum and the developing roller are spaced from each other, the engaging portion and the second main assembly drive transmission member of the shaft coupling member engage each other smoothly, and therefore, the mounting property is improved.

In addition, the rotational accuracy of the developing roller can be improved, and therefore, the image quality can be improved.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Applications Nos. 332837/2006 and 259660/2007 filed Dec. 11, 2006 and Oct. 3, 2007, respectively which are hereby incorporated by reference.

What is claimed is:

1. A process cartridge comprising:
a photosensitive drum;
a developing roller configured to develop a latent image formed on the photosensitive drum;
a coupling including a driving force receiving portion and a driving force transmitting portion, the coupling being operatively connected to the developing roller so that the coupling is capable of transmitting a driving force from the driving force receiving portion to the developing roller through the driving force transmitting portion;
a toner supplying roller in contact with the developing roller, the toner supplying roller being configured to supply toner to the developing roller;
a toner chamber containing the toner;
a developing chamber in which the toner supplying roller is positioned; and
a feeding member positioned in the toner chamber,
wherein the driving force receiving portion is movable relative to the driving force transmitting portion in a direction crossing an axis of the driving force receiving portion such that a position of the axis of the driving force receiving portion relative to an axis of the driving force transmitting portion is changeable, and
wherein, when the process cartridge is oriented with the photosensitive drum and the developing roller positioned at an upper part of the process cartridge, (i) the developing chamber is positioned above the toner chamber, and (ii) the feeding member is configured to feed the toner upward from the toner chamber to the developing chamber.

2. A process cartridge according to claim 1, wherein the feeding member is rotatable.

3. A process cartridge according to claim 1, wherein the feeding member includes a sheet and a shaft.

4. A process cartridge according to claim 1, wherein the driving force receiving portion includes projections.

5. A process cartridge according to claim 1, wherein the coupling is positioned at a side of the process cartridge in a direction of an axis of the photosensitive drum.

6. A process cartridge according to claim 1, wherein the developing roller is capable of moving toward and away from the photosensitive drum, and
wherein a position of the driving force receiving portion relative to the driving force transmitting portion is configured to change in response to movement of the developing roller relative to the photosensitive drum.

7. A process cartridge according to claim 1, further comprising a retaining portion configured to retain the driving force receiving portion in a state in which the axis of the driving force receiving portion is offset from the axis of the driving force transmitting portion.

8. A process cartridge according to claim 1, further comprising a spring configured to urge the driving force receiving portion in the direction that crosses the axis of the driving force receiving portion such that the axis of the driving force receiving portion is offset from the axis of the driving force transmitting portion.

9. A process cartridge according to claim 1, wherein the coupling includes an intermediate portion configured to transmit the driving force from the driving force receiving portion to the driving force transmitting portion, and wherein the driving force receiving portion is movable relative to the intermediate portion, and the intermediate portion is movable relative to the driving force transmitting portion.

10. A process cartridge according to claim 1, wherein the coupling is an Oldham coupling.

* * * * *